US012790037B2

(12) United States Patent
Marcopulos

(10) Patent No.: US 12,790,037 B2
(45) Date of Patent: Nov. 10, 2026

(54) SPACECRAFT PROPULSION AND POSITIONER SIMULATOR

(71) Applicant: Maxar Space LLC, Westminster, CO (US)

(72) Inventor: Theodore Marcopulos, Loomis, CA (US)

(73) Assignee: Lanteris Space LLC, Palo Alto, CA (US)

( * ) Notice: Subject to any disclaimer, the term of this patent is extended or adjusted under 35 U.S.C. 154(b) by 630 days.

(21) Appl. No.: 17/966,470

(22) Filed: Oct. 14, 2022

(65) Prior Publication Data

US 2024/0124167 A1 Apr. 18, 2024

(51) Int. Cl.
*B64G 7/00* (2006.01)
*B64G 1/40* (2006.01)

(52) U.S. Cl.
CPC . *B64G 7/00* (2013.01); *B64G 1/40* (2013.01)

(58) Field of Classification Search
CPC .................................... B64G 7/00; B64G 1/40
See application file for complete search history.

(56) References Cited

U.S. PATENT DOCUMENTS 9,108,748 B2 8/2015 Munir et al.
2005/0230557 A1 10/2005 Aghili
2022/0127023 A1 4/2022 Norwood

FOREIGN PATENT DOCUMENTS

CN 208076158 11/2018
CN 111141976 5/2020
CN 111551369 8/2020
CN 112407337 2/2021
JP 2007023914 2/2007

OTHER PUBLICATIONS

Enpulsion Thruster Simulator Suite, Doc. No. ENP2023-017, Rev. A.1, pp. 1-2. (Year: 2023).*

(Continued)

*Primary Examiner* — Lorne E Meade
(74) *Attorney, Agent, or Firm* — Pearl Cohen LLP

(57) ABSTRACT

An electric propulsion simulator console (EPSC) which electronically simulates an electric propulsion assembly of a spacecraft as well as propulsion fuel control components and positioning components of the spacecraft. The EPSC simulates a spacecraft thruster electrical interface can test four thruster interfaces simultaneously and continuously. The simulator additionally facilitates the testing of spacecraft fault detection, isolation, and recovery by simulating failed magnet circuits, open anode paths, and flameout conditions. The EPSC includes an electrical propulsion unit load simulator adapted to receive propulsion unit control signals from a spacecraft under test and a spacecraft propulsion unit positioner simulator the simulator adapted to display a simulated state of three axes of movement for at least one propulsion unit positioner responsive to positioning signals received from the spacecraft under test. A propulsion unit fuel valve simulator is also provided and can display a simulated state of propulsion unit fuel valves responsive to control signals received from the spacecraft under test.

16 Claims, 26 Drawing Sheets

(56) References Cited

OTHER PUBLICATIONS

DACTEM International webpage, accessed on Apr. 3, 2025, pp. 1-12. (Year: 2025).*
Manzella, David et al., "Performance Evaluation of the SPT-140", 25th International Electric Propulsion Conference, Aug. 24-28, 1997, pp. 1-10.
Goebel, Dan M., et al., Fundamentals of Electric Propulsion: lon and Hall Thrusters, Chapter 9, Flight Ion and Hall Thrusters, Mar. 2008, pp. 429-446.
Olshanskaya, O.V., et al., "Analysis of the SPT-140 thruster mechanical strength", 6th Russian-German Conference on Electric Propulsion and Their Application, Procedia Engineering 185, 2017, pp. 69-76.
"Hall-effect thruster", Wikipedia, The Free Encyclopedia [retrieved Oct. 13, 2022 from https://en.wikipedia.org/w/index.php?title=Hall-effect_thruster&oldid=1115064993].
Extended European Search Report dated Feb. 14, 2024, European Patent Application No. 23199510.1, 57 pages.
Communication under Rule 71(3) EPC dated May 26, 2025, European Patent Application No. 23199510.1, 63 pages.

* cited by examiner

STEP LOGIC TABLE

| PHASE | A | B | C |
|---|---|---|---|
| STEP 1 | H | H | L |
| STEP 2 | H | L | L |
| STEP 3 | H | L | H |
| STEP 4 | L | L | H |
| STEP 5 | L | H | H |
| STEP 6 | L | H | L |

SPACECRAFT PROPULSION AND POSITIONER SIMULATOR

BACKGROUND

Spacecraft, such as satellites, shuttles, space stations, inter-planet traveling crafts, and rockets, often have an electric propulsion (EP) system that includes a power processing unit (PPU), an electrical thruster (e.g., a Hall Effect Thruster (HET)), and a propellant management assembly (PMA). The PPU also generally includes various different subsystems including an anode and ignitor supply subsystem, a heater supply subsystem, a magnet control subsystem, a flow control subsystem, a valve control subsystem and a command and telemetry subsystem. Many of these subsystems of a PPU provide signals to the HET and PMA. HETs provide a large electrical load for the PPU to interface with. In order to ensure reliability, spacecraft manufacturers may test the PPU and PMA of spacecraft using simulated EP loads. As each spacecraft may include multiple electrical thrusters, each thruster should be subjected to testing.

BRIEF SUMMARY

One general aspect includes an spacecraft test apparatus. The spacecraft test apparatus includes an electrical propulsion unit load simulator including at least an anode simulator, and propulsion valve load simulators, and including a PPU connector, the electrical propulsion unit load simulator adapted to receive propulsion unit control signals from a spacecraft under test; a spacecraft propulsion unit positioner simulator, including a spacecraft control unit connector, the simulator adapted to display a simulated state of three axes of movement for at least one propulsion unit positioner responsive to positioning signals received from the spacecraft under test; and a propulsion unit fuel valve simulator adapted to display a simulated state of propulsion unit fuel valves responsive to control signals received from the spacecraft under test. Other embodiments of this aspect include corresponding computer systems, apparatus, and computer programs recorded on one or more computer storage devices, each configured to perform the actions of the methods.

Embodiments of the technology may include a test apparatus where the load simulator is associated a regenerative power supply. Embodiments of the technology may include a test apparatus where the electrical propulsion unit load simulator further includes a heater load simulator, at least one magnet load simulator and an igniter simulator. Embodiments of the technology may include a test apparatus where the electrical propulsion unit load simulator includes a display providing a voltage and current output for the anode simulator, heater simulator, igniter simulator and the at least one magnet simulator. Embodiments of the technology may include a test apparatus where the electrical propulsion unit load simulator includes a state display providing the state of the propulsion unit valves simulated. Embodiments of the technology may include a test apparatus further including a test apparatus controller coupled via a communication bus to the electrical propulsion unit load simulator, positioner simulator and fuel valve simulator. Embodiments of the technology may include a test apparatus where the positioner simulator is adapted to simulate the state of at least two two/three-axis, three phase propulsion unit positioner motors. Embodiments of the technology may include a test apparatus where further including a spacecraft control signal simulator, the control signal simulator adapted to selectively output control signals to the propulsion unit load simulator, positioner simulator and fuel valve simulator upon connection to the PPU connector and the control unit connector, to provide a self-test for the propulsion unit load simulator, positioner simulator and fuel valve simulator. Embodiments of the technology may include a test apparatus further including a plurality of load simulators and a plurality of regenerative power supplies provided in a rolling chassis.

One general aspect includes an spacecraft testing system. The spacecraft testing system also includes a plurality of electrical propulsion unit load simulators, each including at least an anode simulator, and propulsion valve load simulators for a propulsion unit of a spacecraft under test, each including a PPU connector for the spacecraft under test and adapted to receive propulsion unit control signals from the spacecraft under test; a spacecraft propulsion unit positioner simulator adapted to display a simulated state of two/three axes of movement for at least one propulsion unit positioner of the spacecraft responsive to positioning signals received from the spacecraft under test, and a propulsion unit fuel valve simulator adapted to display a simulated state of propulsion unit fuel valves responsive to control signals received from the spacecraft under test.

Embodiments of the technology may include a spacecraft testing system where each of the plurality of load simulators is associated with a regenerative power supply providing 20 kW of load capability. Embodiments of the technology may include a spacecraft testing system where each of the plurality of electrical propulsion unit load simulators further includes a heater load simulator, one or two magnet load simulators and an igniter load simulator, and further includes a display providing a voltage and current output for the anode simulator, heater load simulator, igniter load simulator and the first and second magnet simulators. Embodiments of the technology may include a spacecraft testing system where the electrical propulsion unit load simulator includes an indicator displaying the state of the propulsion unit valves simulated. Embodiments of the technology may include a spacecraft testing system where the system further includes a test system controller coupled via a communication bus to the plurality electrical propulsion unit load simulator, positioner simulator and fuel valve simulator. Embodiments of the technology may include a spacecraft testing system where the controller is adapted to control the load simulated by any of the plurality of electrical propulsion unit load simulators, spacecraft propulsion unit positioner simulator and propulsion unit fuel valve simulator to vary the load conditions. Embodiments of the technology may include a spacecraft testing system where the positioner simulator is adapted to simulate the state of at least two two/three-axis, three phase propulsion unit positioner motors. Embodiments of the technology may include a spacecraft testing system where the system further includes a spacecraft control signal simulator, the control signal simulator adapted to selectively output control signals to the propulsion unit load simulator, positioner simulator and fuel valve simulator upon connection to the PPU connector and the propulsion unit positioner, to provide a self-test for the propulsion unit load simulator, positioner simulator and fuel valve simulator. Embodiments of the technology may include a spacecraft testing system where the plurality of electrical propulsion unit load simulators, spacecraft propulsion unit positioner simulator and propulsion unit fuel valve simulator are provided in a rolling chassis.

Another general aspect includes a method of testing a control system of a spacecraft under test. The method includes coupling a spacecraft power processing unit and positioning controller to a test system. The method also includes receiving propulsion unit control signals from the spacecraft under test; simulating a plurality of electrical propulsion unit loads, each including at least an anode load, magnet load, heater load, and propulsion valve load; receiving spacecraft propulsion unit positioning control signals from the spacecraft under test; simulating a plurality of positioning system loads, each including multi-axis position of one or more thrusters; receiving spacecraft propulsion fuel flow control signals from the spacecraft under test; and simulating loads of propulsion unit fuel valves responsive to propulsion fuel flow control signals received from the spacecraft under test.

Implementations may include displaying a voltage and current output for the electrical propulsion unit loads, displaying a motor position state reflecting the multi-axis position of the one or more thrusters, and displaying a state for each of the propulsion unit fuel valves.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

Technology is described to enable a testing unit for a spacecraft power processing unit (PPU) and propulsion systems controls. In embodiments, the technology is directed to an electric propulsion simulator console (EPSC) which electronically simulates an electric propulsion assembly of a spacecraft as well as propulsion fuel control components and positioning components of the spacecraft. The EPSC simulates a spacecraft thruster electrical interface and allows the test engineers to evaluate a variety of nominal and non-standard operating conditions. The technology is capable of testing four thruster interfaces simultaneously and continuously, allowing the ability to completely test a high-capacity PPU as well as associated cabling, and intermediary electronics by imposing a simulated DC load on the spacecraft bus. The system can modulate a simulation of an electric propulsion system's anode current at up to 20 kHz, simulating the ionization of the plasma stream from an electronic propulsion system at up to 12 kW. The simulator additionally facilitates the testing of spacecraft Fault Detection, Isolation, and Recovery (FDIR) by simulating failed magnet circuits, failed heater circuits, open anode paths, and flameout conditions. The anode path simulation can support characteristics of Low Earth Orbit (LEO), Geosynchronous Earth Orbit (GEO) and Deep Space applications through a variable anode load capability.

Under normal operating conditions the EPSC provides representative electrical loads to the spacecraft under test to facilitate verification of the spacecraft's (PPU) and (EPS). Under non-standard operating conditions the EPSC can simulate fault conditions and operating conditions out of standard range to allow evaluation and confirmation of the spacecrafts ability to detect and react to faults and to adjust operating conditions to accommodate variations in operating conditions. The EPSC allows testing of the analog voltage and current on the anode of a thruster, verifying that the PPU can supply current to supply the magnets, and other components, and determine if the PPU can provide stimulation for the spacecraft heaters. The EPSC can modulate the anode current of a propulsion unit.

Figure 1A:
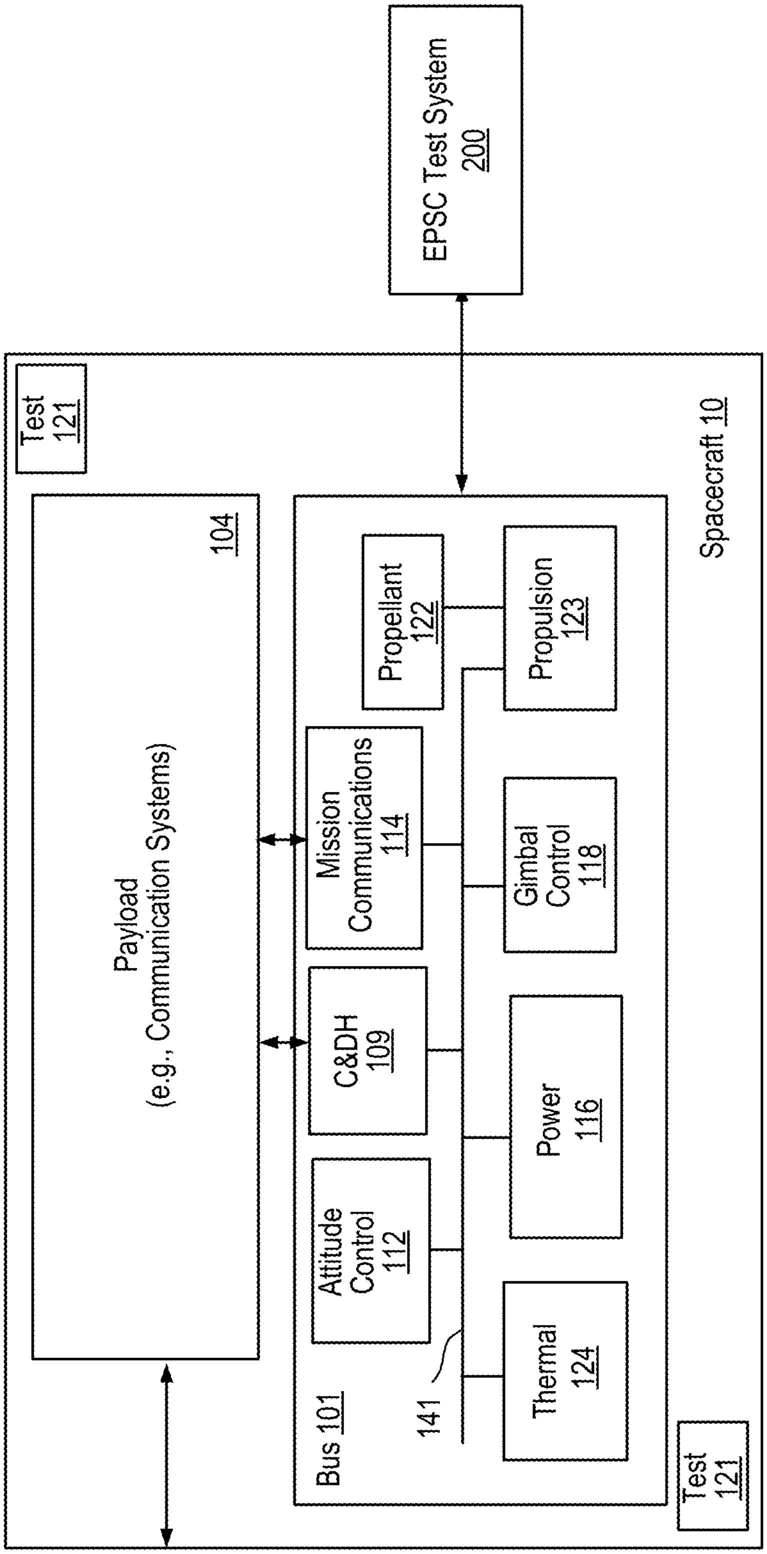
FIG. 1A is a block diagram of components of a spacecraft coupled to a spacecraft testing system.

FIG. 1A is a block diagram of one embodiment of spacecraft 10, which in one example is a satellite. In one embodiment, spacecraft 10 includes a bus 101 and a payload 104 carried by bus 101. Some embodiments of spacecraft 10 may include more than one payload. The payload provides the functionality of communication, sensors and/or processing systems needed for the mission of spacecraft 10.

In general, bus 101 is the spacecraft that houses and carries the payload 104, such as the components for operation as a communication satellite. The bus 101 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 109, attitude control systems 112, mission communication systems 114, power subsystems 116, gimbal control electronics 118, a propulsion system 123 (e.g., thrusters), propellant 122 to fuel some embodiments of propulsion system 123, and thermal control subsystem 124, all of which are connected by an internal communication network 141, which can be an electrical bus (a "flight harness") or other means for electronic, optical or RF communication when spacecraft is in operation. Also represented are an antenna 143, that is one of one or more antennae used by the mission communications system 114 for exchanging communications for operating of the spacecraft with ground terminals, and a payload antenna 117, that is one of one or more antennae used by the payload 104 for exchanging communications with ground terminals, such as the antennae used by a communication satellite embodiment. The spacecraft can also include a number of test sensors 121, such as accelerometers that can used when performing test operations on the spacecraft. Other equipment can also be included.

The command and data handling module 109 includes any processing unit or units for handling includes command control functions for spacecraft 10, such as for attitude control functionality and orbit control functionality. Power subsystems 116 can include one or more solar panels and charge storage (e.g., one or more batteries) used to provide power to spacecraft 10. Propulsion system 123 (e.g., thrusters) is used for changing the position or orientation of spacecraft 10 while in space to move into orbit, to change orbit or to move to a different location in space. The gimbal control electronics 118 can be used to move and align the antennae, solar panels, and other external extensions of the spacecraft 10. In embodiments, the gimbal control electronics 118 control the positioning of the spacecraft thrusters described herein.

Propulsion system 123 may comprise a hall-effect thruster (HET). As will be appreciated by those of skill in the art, an HET is a type of electrical thruster for spacecraft that operates on a propellant, such a xenon, to accelerate ions up to high speeds to produce thrust for maneuvering the spacecraft. Other types of propellants that may be used by the HET include, for example, krypton, argon, bismuth, iodine, magnesium, zinc and adamantane, but are not limited thereto. The thruster is generally cylindrical and comprises an annular accelerating channel defined between inner and outer walls at the bottom of which is an anode assembly. A connection assembly supplies an electrical connection to the anode. The HET also includes a cathode mounted adjacent to the thruster ring which is supplied with xenon gas through a connection and with a source of negative potential.

A spacecraft propulsion system 123 may include one or multiple thrusters and PPUs. The PPUs provide conditioned electric power from the spacecraft bus for thruster operation over a discharge power range of 0.9 kW to 12 kW, and also automated system startup and control, telemetry, and some fault protection logic.

The spacecraft 10 may be coupled by any number of connectors and cables to the EPSC 200 described herein for testing prior to launch. FIG. 1A illustrates this connection.

Figure 1B:
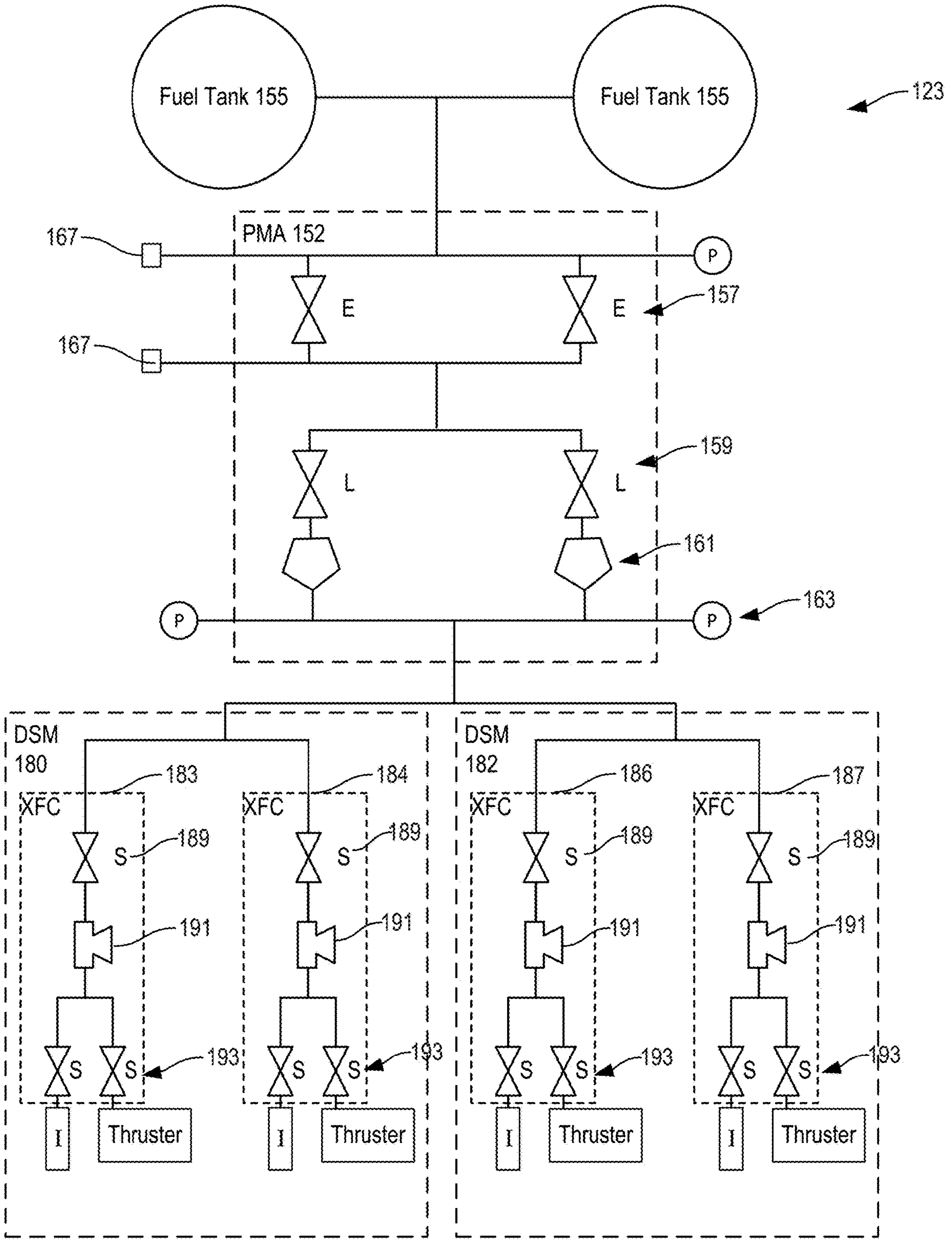
FIG. 1B is a block diagram of the fuel system valves of a spacecraft.

A general system pneumatic diagram of a propulsion system 123 for a four-thruster spacecraft is illustrated in FIG. 1B. In such a spacecraft, there are two primary and two redundant thrusters. Each primary/redundant thruster pair may also be referred to as a "north" primary thruster and "north redundant thruster, and "south" primary thruster and "south" redundant thruster (with "north" and "south", generally referring to the direction of the spacecraft about an orbital body). Xenon is stored in a set pressure tanks 155. A pressure management assembly (PMA) 152 provides for tank isolation and pressure regulation through a set of redundant pyrotechnic valves (E) 157, latch valves (L) 159, and pressure regulators 161. Two pressure transducers (P) 163 are also provided. The PMA may also include fill/drain valves 167 for propellant loading and test operations. Low-pressure xenon is routed to one of four flow controllers (XFC) 183-187 which provide fine flow control to the thrusters. Each XFC 183-187 contains a solenoid valve 189, solenoid valve 189 for flow isolation, a thermothrottle 191 and two solenoid valves 193 respectively coupled to one of the thrusters and igniter (I) for flow control, both of which are controlled by the propulsion system 123.

The thrusters and XFCs are integrated onto gimbaled assemblies called DSMs 180, 182 (where "DSM" refers to "DAPM Actuated SPT Module" and "DAPM" is the "Dual-Axis Positioning Mechanism" (or may be Three-Axis Positioning Mechanism (TAPM)). In embodiments, two DSMs are located on either side of the spacecraft and provide five-degree-of-freedom control which is commanded by the spacecraft command and data handling module 109.

Figure 2A:
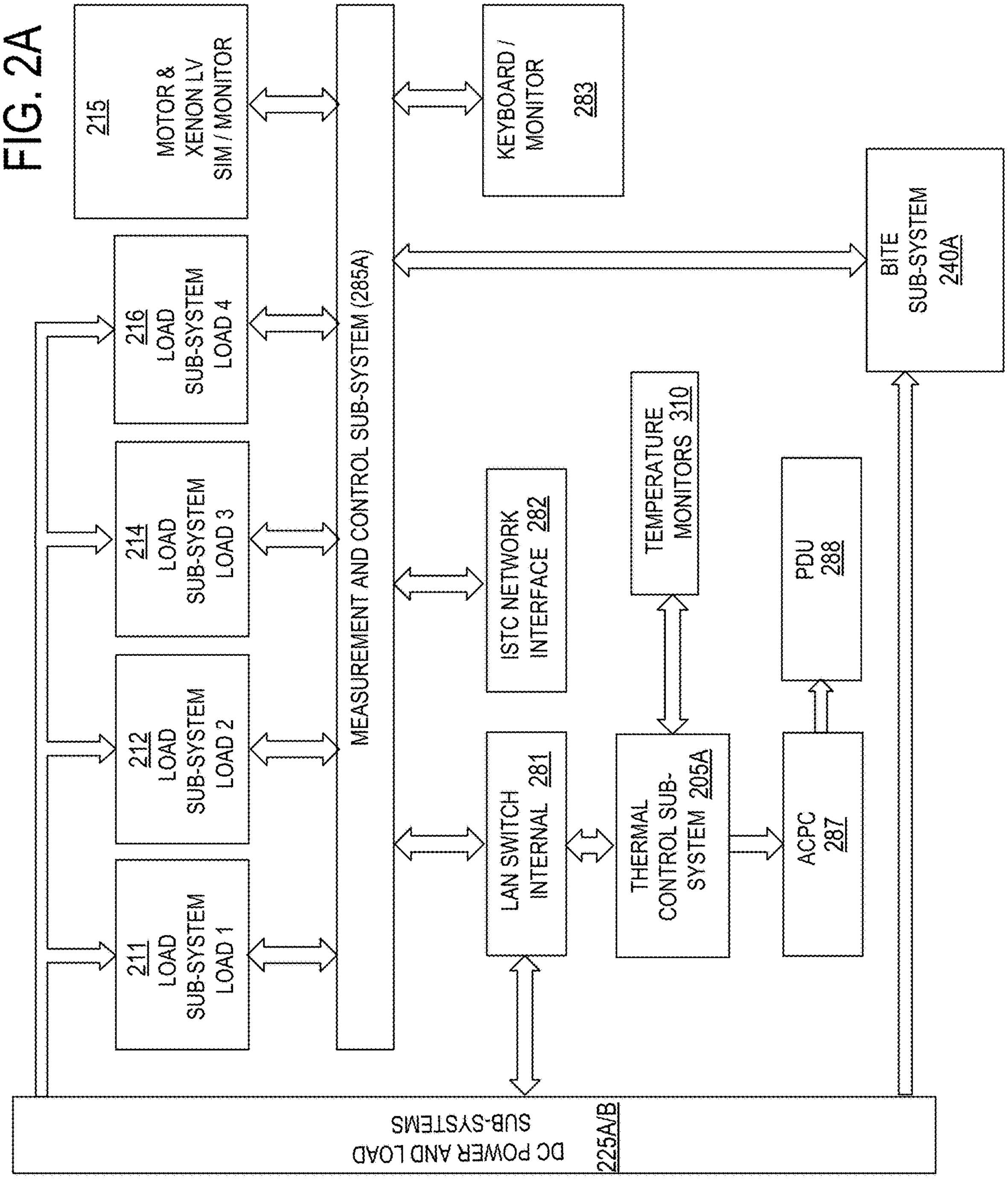
FIG. 2A is an overview block diagram of the subsystems of an electric propulsion simulator console.

FIG. 2A is an overview block diagram of the subsystems of the EPSC 200. Four load subsystems 211, 212, 214, 216 simulate thruster loads to a connected spacecraft PPU under test. A motor and latch valve simulator/monitor (referred to herein as a ⅔ axis/latch valve simulator) 215 provides simulated latch valve and motor signals to the spacecraft under test. Each of these subsystems 211, 212, 214, 216 and simulator 215 is coupled to a measurement and control subsystem 285A. The measurement and control subsystem 285A includes a processor and interface (described herein) which may be controlled by a test system operator through a keyboard and monitor 283. A local area network (LAN) switch 281 provides a communication connection (via a communication bus 260 (FIG. 2B)) between the measurement and control subsystem 285A, a thermal control subsystem 205A and DC power and load subsystems 225A/B. An Integrated Spacecraft Text Complex (ITSC) network interface 282 is provided to couple the spacecraft 10 to the test system. The complex may include the test equipment, all the computers that run test scripts that control the spacecraft and the various racks, and a telemetry archiving system. A plurality of temperature monitors 310 are provided throughout the EPSC 200. A power distribution unit 288 is provided for AC power distribution, while an AC power control (ACPC) 287 turns the AC power on/off to the system and has internal protections for AC line overvoltage and under voltage, overcurrent, incorrect line frequency, missing phase, inverted phase rotation as well as EMI filtering. Also provided is a built-in test equipment subsystem 240A. Additional details of the subsystems of FIG. 2A are provided herein.

Figure 2B:
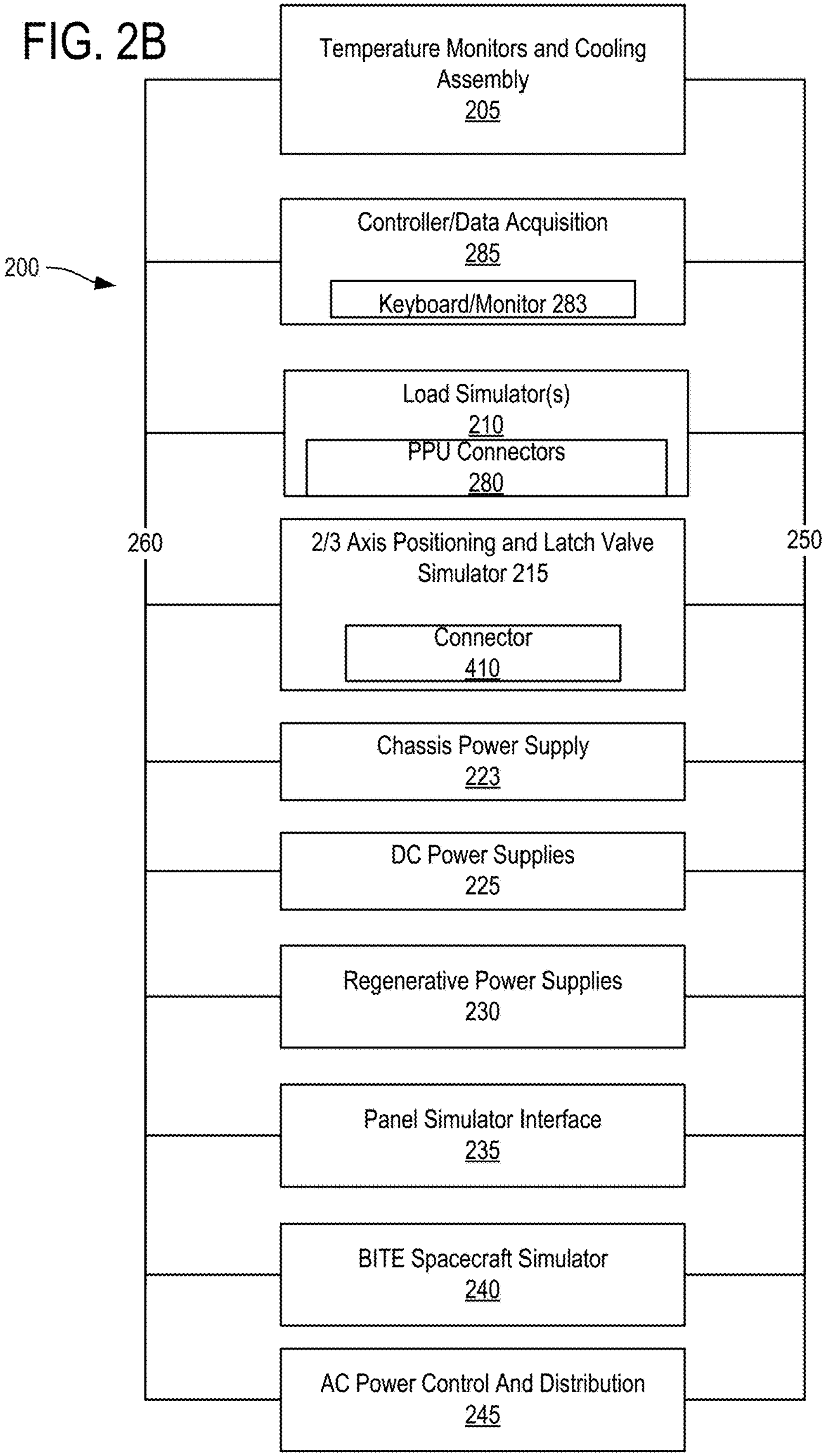
FIG. 2B is a block diagram of an electric propulsion simulator console illustrating the components thereof.
Figure 2C:
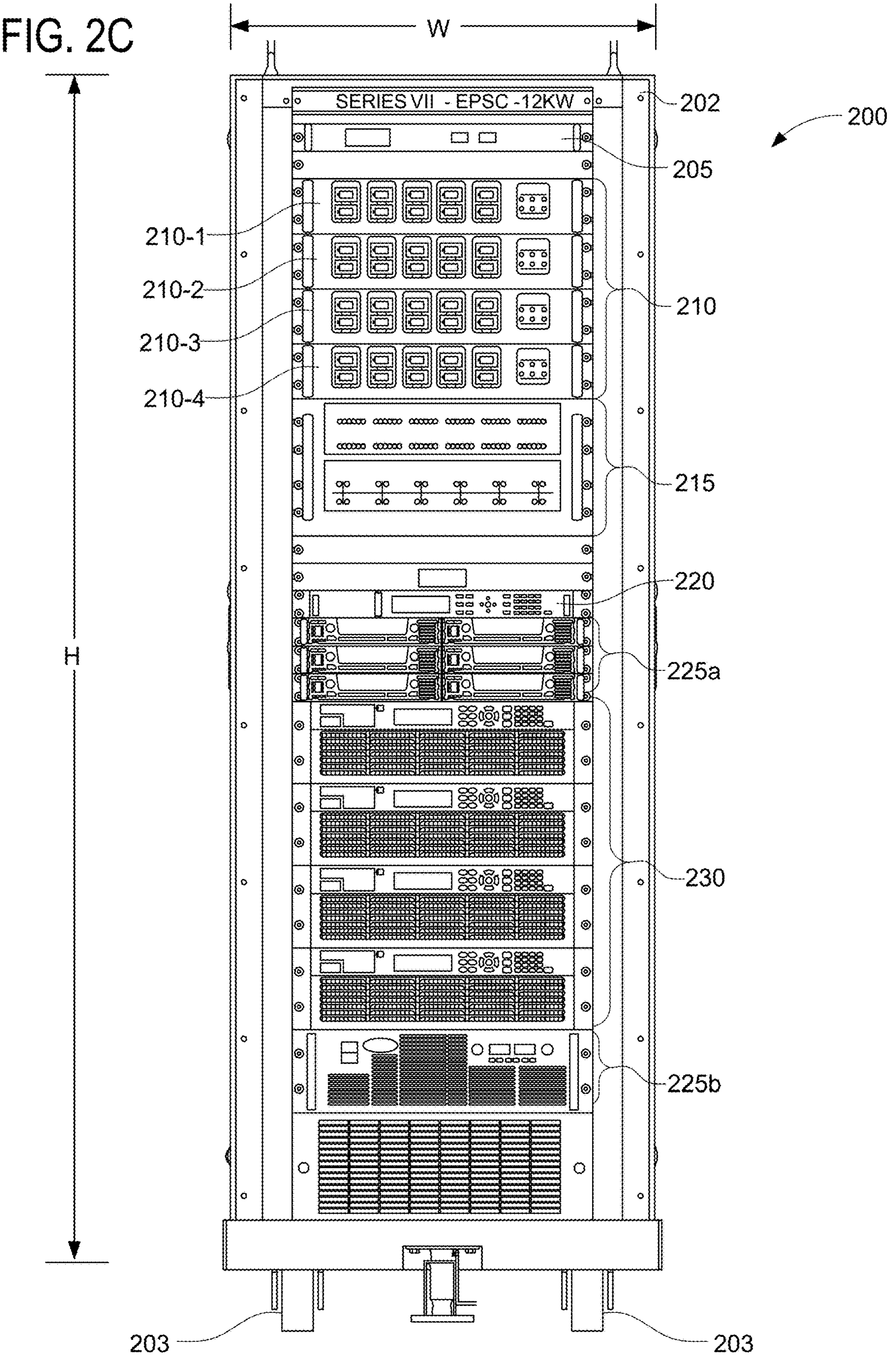
FIGS. 2C and 2D are front and back views, respectively illustrating the physical arrangement of components of an EPSC in a console system.
Figure 2D:
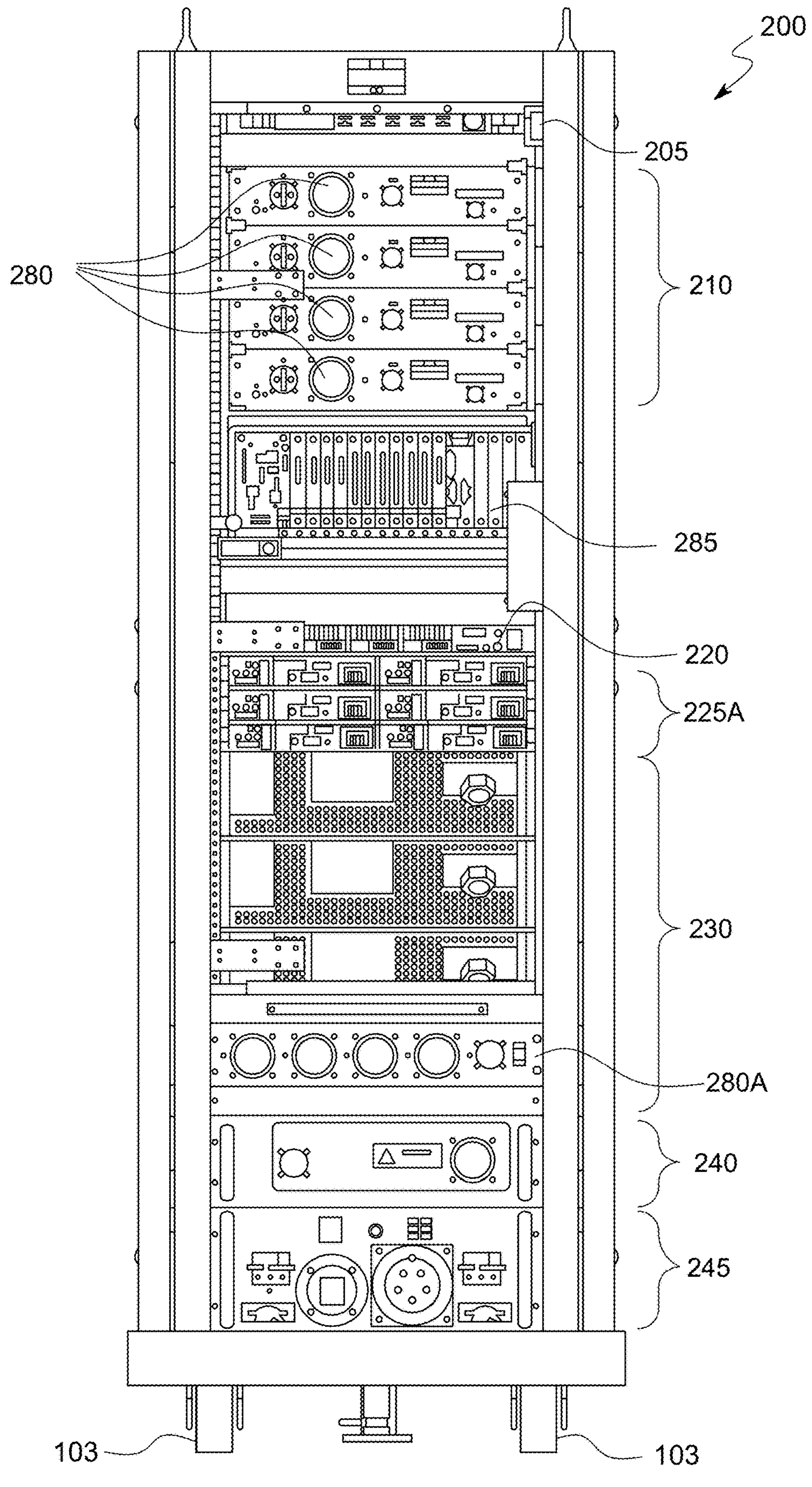

FIGS. 2B-2D illustrate the components of the EPSC. FIG. 2B is a block diagram of an EPSC illustrating the components thereof. FIGS. 2C and 2D are front and back views, respectively illustrating the physical arrangement of components of an EPSC in a fixed size console 202.

EPSC 200 includes one or more load simulators 210, a ⅔ axis positioning and latch valve simulator 215 (hereinafter "⅔ axis/latch valve simulator" 215), a panel simulator interface 235, a built-in test unit 240 comprising a spacecraft control signal simulator, and a data acquisition and controller unit 285. The EPSC 200 also includes power supply and temperature control components including temperature monitors and cooling assembly 205, chassis power supply 224, DC power supplies 225, two quadrant regenerative power supplies 230 (used in conjunction the load simulator 210), and AC power supply control and distribution unit 245. Also shown in FIG. 2 are a power distribution bus 250 and a data signal and control bus 260. The specific configuration of bus 250 and bus 260 is tailored to the components provided in the EPSC.

In a unique aspect, the EPSC can be contained in a fixed size, movable console 102 having a height H, a width W and a depth D (as shown in FIGS. 2C and 2D). The console 102 is portable, being positioned to roll on wheels 103 allowing repositioning of the EPSC within a manufacturing and test environment. In one embodiment, the height H is 76 inches, the width W is 27 inches and the depth D (facing into the page of FIGS. 2C and 2D) is 48 inches. As illustrated in FIGS. 2C and 2D, the placement of the physical components represented by the block components of FIG. 2B enables the testing functions provided by the EPSC to be contained within a finite physical space of the console 202.

In one embodiment, the temperature monitor and cooling assembly 205 is provided at the uppermost portion of the console 202. Various temperature sensors or monitors 310 (FIG. 3) may be provided throughout the console 202, at locations to monitor temperatures around the console itself and at locations to monitor inlet air and exhaust air of the components described herein. This allows comprehensive temperature monitoring by the temperature monitor and cooling assembly 205, and adjustment of cooling fans 310 (FIG. 3) within the assembly 205 and/or temperature-controlled warnings or shutdown based on temperature related issues within the EPSC 200. Generally, cooling fans (not shown in FIG. 2B) may be positioned within the cooling assembly 205 at the upper portion or top of the console 202 to extract warm/hot air out of the console.

Below the temperature monitor and cooling assembly 205 are four PPU load simulators 210 (210-1 through 210-4). Additional details regarding the PPU load simulators 210 in provided below. The load simulators 210, in conjunction with the regenerative power supplies (one simulator associated with one regenerative power supply), simulate the electrical interface of a spacecraft thruster. Each load simulator and associated regenerative power supply can run simultaneously with all other load simulators and regenerative power supplies indefinitely.

Each load simulator includes a PPU connector 280. Each PPU connector is tied to a connector panel 280A (FIG. 2C) with a one-to-one correspondence between the four connectors on panel 280A and on the load simulator.

Positioned below the four load simulators 210 is ⅔ axis/latch valve simulator 215. Simulator 215 is a short depth, four rack unit (4ru) sized element, but occupying less than the front half of the depth of console 202. Behind the axis positioning and latch valve simulator 215, as shown in FIG. 2C, is the controller and data acquisition unit 285. The controller and data acquisition unit occupies the same 4RU rack space and is also less than one-half the depth of the console 202.

A chassis power supply 220 is provided below the 2 and 3 axis positioning and latch valve simulator 215. As described herein, the chassis power supply 220 powers various components such as the temperature monitors and cooling assembly 205.

Below the chassis power supply 220 are a number of DC power supplies 225A. Power supplies 225A are used to simulate spacecraft magnets, heaters and motors, the power to which are normally provided by the spacecraft itself. In one embodiment, six 1U, ½ RU individual power supplies are utilized. In one embodiment, DC power supplies 225A are programmable power supplies that can be operated a constant voltage or constant current depending on load conditions within the range voltage value. Each supply 225A may comprise model GH 40-38, GH 60-25 or GH 600 power supplies available from TDK-Lambda Corporation.

Below the DC power supplies 225A are four regenerative power supplies 230. In one embodiment, four Keysight model RP7972A regenerative power systems are used. Each of the power supplies 230 is a single output, bi-directional, regenerative DC power supply with regenerative capability that enables the energy normally consumed to be returned to the grid saving cost associated with energy consumption and cooling. Each unit supplies 1000V, +/−60A, 20 kW, 400/480 VAC in a 3RU rack space. One each of the regenerative power supplies is associated with one of the load simulators as illustrated in FIG. 3.

Below the regenerative power supplies 230 is an additional programmable DC supply 127 in the form of a TDK-Lambda GSP600-25.2-3p208. Behind the power supply 125 at the rear of the console 102 is a built-in test unit 140, and the AC power supply control and distribution unit 145. The built-in test unit 140 simulates spacecraft controls, including motor drivers for the ⅔ axis simulator, and may be coupled to each of the four load simulators to allow self-testing of each of the simulator units.

Figure 3:
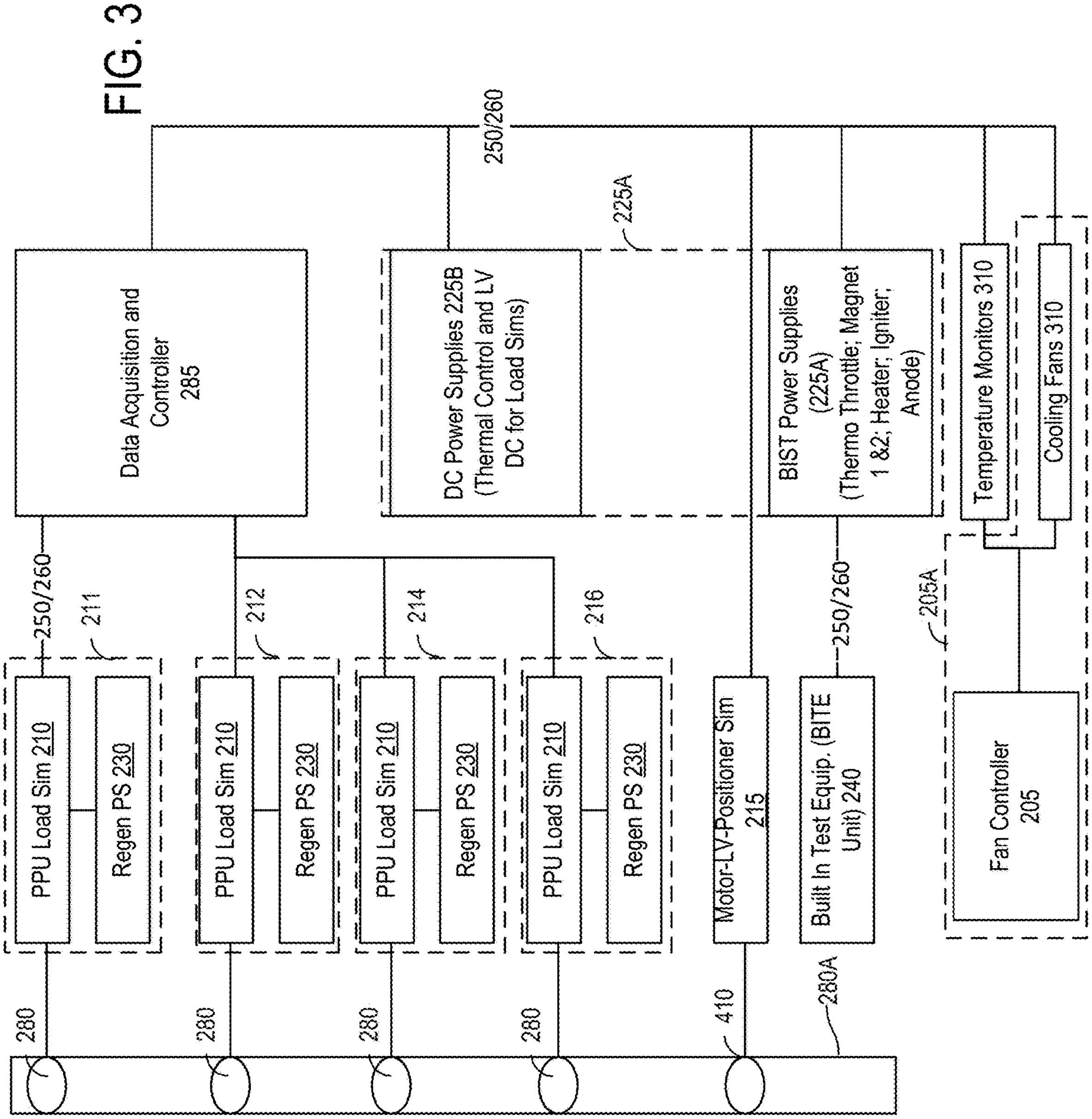
FIG. 3 is a block diagram detailing connections between the PPU load simulators, ⅔ axis/latch valve simulator, spacecraft connectors, and other components of the EPSC.
Figure 12:
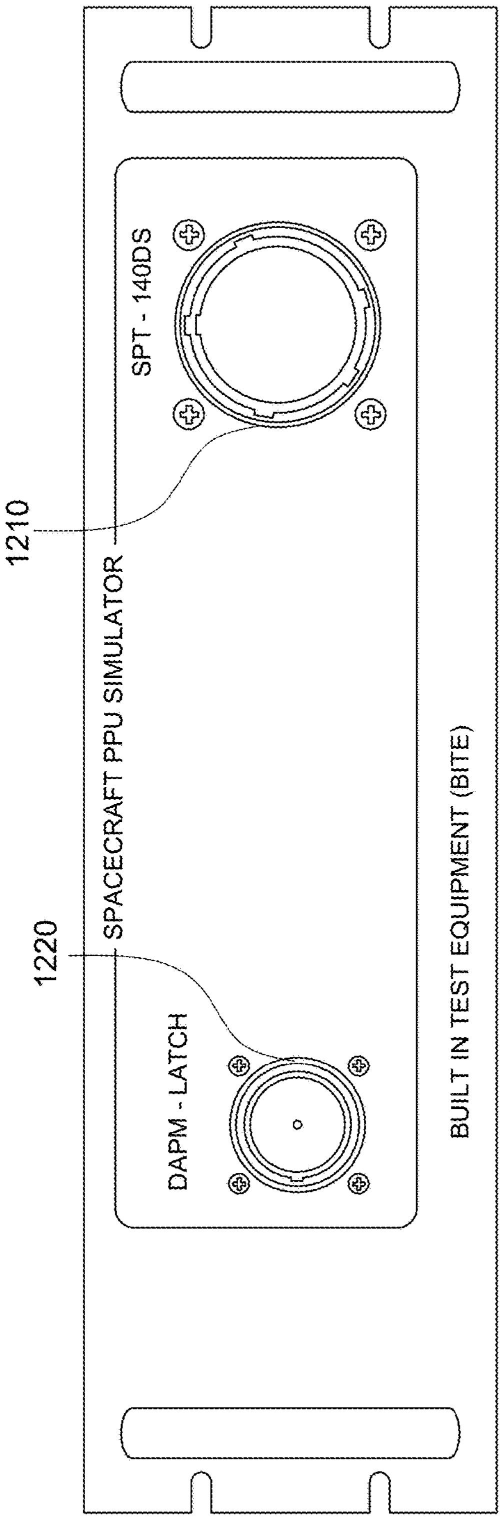
FIG. 12 is a front panel diagram of a built-in test unit and connectors.
Figure 13:
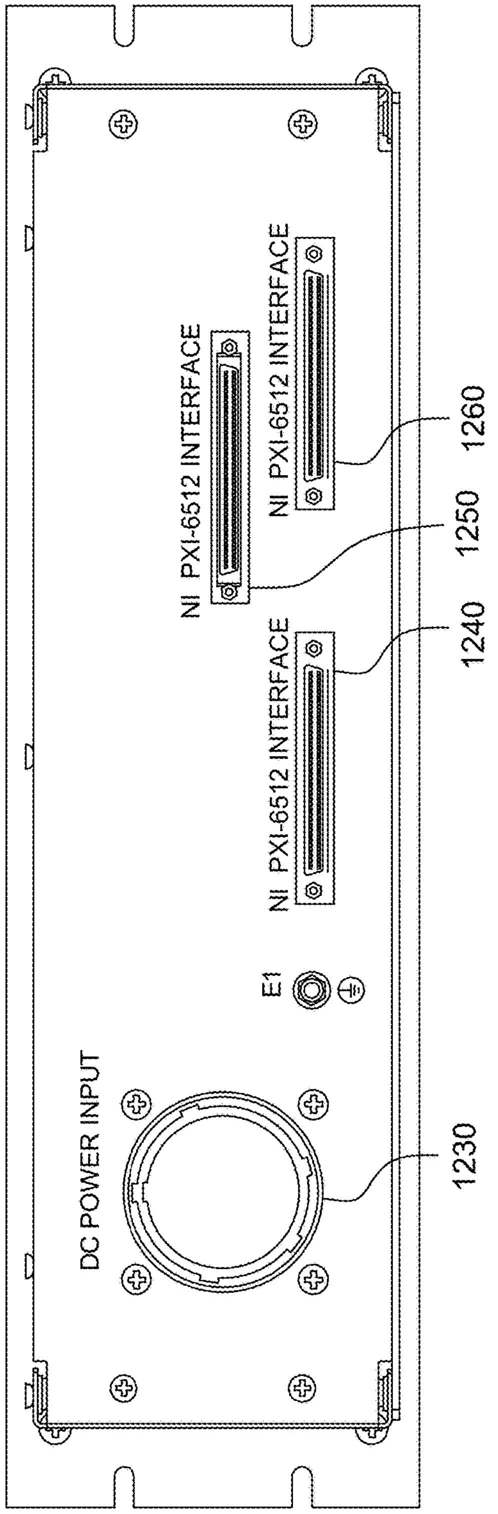
FIG. 13 is a rear panel diagram of the built-in test connector panel

FIG. 3 illustrates the DC signal distribution, communication channel connections for a number of the main components of the EPSC, and further illustrates elements of some of the subsystems of FIG. 2A. In FIG. 3, for convenience, the power bus 250 and the control bus 260 are illustrated as a single bus but it will be understood that in embodiments this is separate buses. Each PPU load simulator 210 has an associated regenerative power supply 230, as discussed above, and may comprise one of the load subsystems 211, 212, 214, 216 of FIG. 2A. Each PPU load simulator 210 is coupled to a spacecraft (or built-in test unit 240) through a PPU connector 280, four of which are provided on a connector interface panel 280A positioned at the rear of the console near the bottom of the console. The connector interface panel allows the connector interface panel 280A to be physically separate from the individual connector 280 provided on the actual chassis of the load simulators 210, providing flexibility and a common point of connection for the spacecraft under test. Each connector on the panel 280*a* provides a connection to one of an identical connector on the load simulator 210. The data acquisition and controller unit 285 comprises part of the measurement and control subsystem 285A (along with various data acquisition interfaces which allow connection to various components of the EPSC) and is coupled by the control bus to each PPU load simulator 210 and regenerative power supply 230. The DC power and load subsystems include power supply 225 is coupled by the power bus to the ⅔ axis/latch valve simulator 215 as well as each load simulator 210. Built-in self-test power supplies 225A are coupled to the built-in test unit 240. As illustrated in FIGS. 12 and 13, built-in test unit 240 includes connectors which can be coupled to any one of the PPU connectors 280 or the ⅔ axis/latch valve simulator 215. The built-in self-test power supplies 225A include a power supply for each for the thermal throttle control, magnets 1 and 2, heater, ignitor, and anode.

A data acquisition and controller unit 285 is coupled to each of the load simulators 210, power supplies 225A, 225B, the ⅔ axis/latch valve simulator 215 and the temperature monitor and cooling assembly 205 which has separate temperature monitors 310 and extraction fans 312. The data acquisition and controller unit 285 logs all temperatures. The data acquisition and controller unit 285 may be implemented by a PXI system available from National Instruments Corp. which includes multiple data acquisition cards interfacing with the various components discussed herein, as well as a PXIe-8840 controller, which is a dual or quad core microprocessor PXI Controller which is an embedded controller for PXI systems. The data acquisition and controller unit 285 additionally may perform many of the tests and control each component to operate at given specifications as described herein. The monitor and keyboard 283 are coupled to the data acquisition and controller unit 285.

Figure 4A:
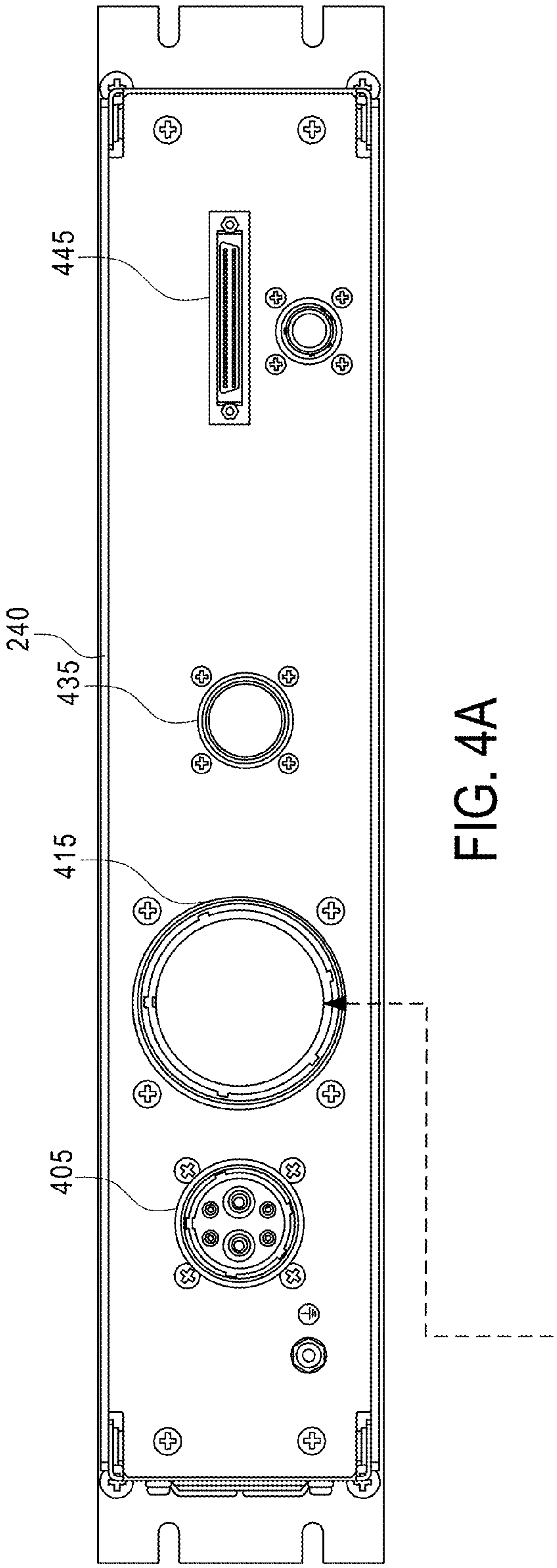
FIG. 4A is a rear view of the PPU load simulator housing and connectors.
Figure 4B:
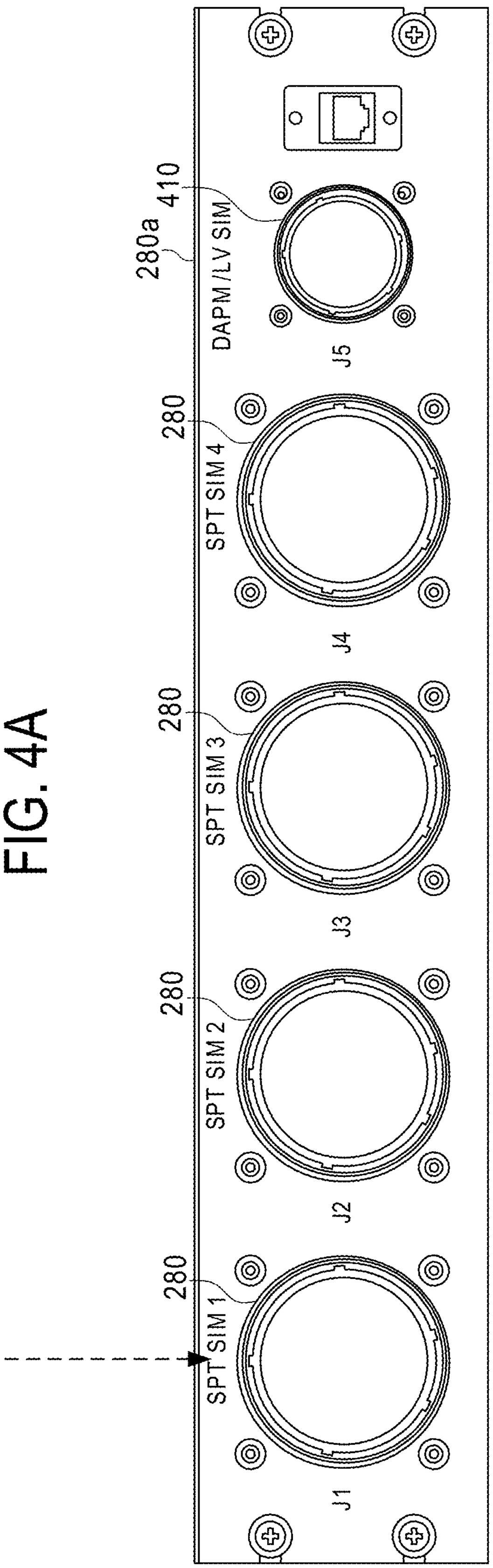
FIG. 4B is a depiction of the PPU and ⅔ axis/latch valve simulator connector panel.

FIG. 4A is a rear view of the PPU load simulator 210 housing and connectors and FIG. 4B is a depiction of the PPU connector interface panel (180*a*). As illustrated therein, one of each of the connectors 280 may be coupled to connector 415 on load simulator 210 housing. Connector 415 is a size 40, 29 pin circular connector including multiple signal channels. Other connectors are illustrated, including a six-socket electrical connection 405 and a communication port 445 which couples unit 240 to the data acquisition and controller unit 285.

As illustrated in FIG. 4B, a one-to-one relationship exists between connectors 280 on panel 280*a* and each of connectors 415 on the back of the PPU load simulator 210 housing.

Figure 5:
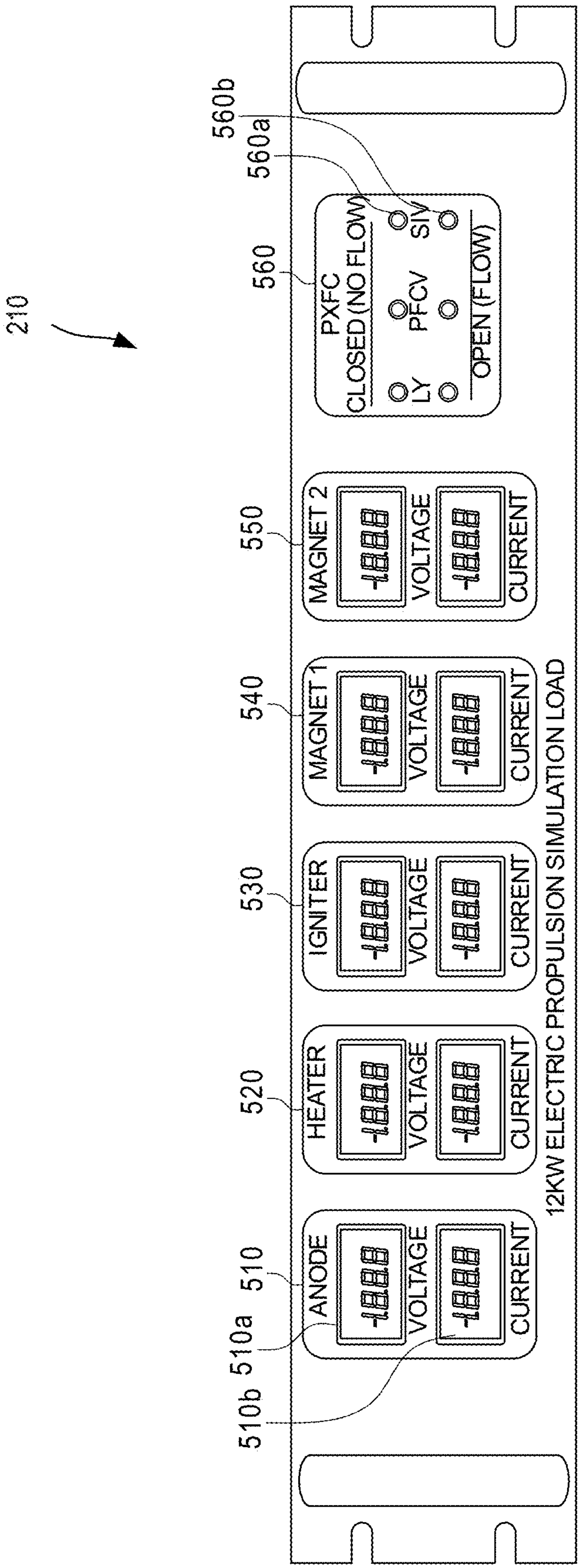
FIG. 5 is a front view of a PPU load simulator output display panel.

FIG. 5 Illustrates the display output of one of the load simulators 210. Each front display panel of each load simulator provides numerical outputs for the current and voltage load which are simulated thereby. Thus, anode display 510, heater display 520, igniter display 530, magnet 1 display 540 and magnet 2 display 550 are provided. Each display includes a numerical voltage (such as anode voltage output 510*a*) and numerical current (such as anode current output 510*b*). The display output also includes a status panel 560 which also indicates the open/closed (flow) status for a latch valve, flow control valve and solenoid isolation (SIV) valves at 560. By way of example, two LEDs illustrate an open status (for example 560*b*) and a closed status (for example 560*a*).

Figure 6:
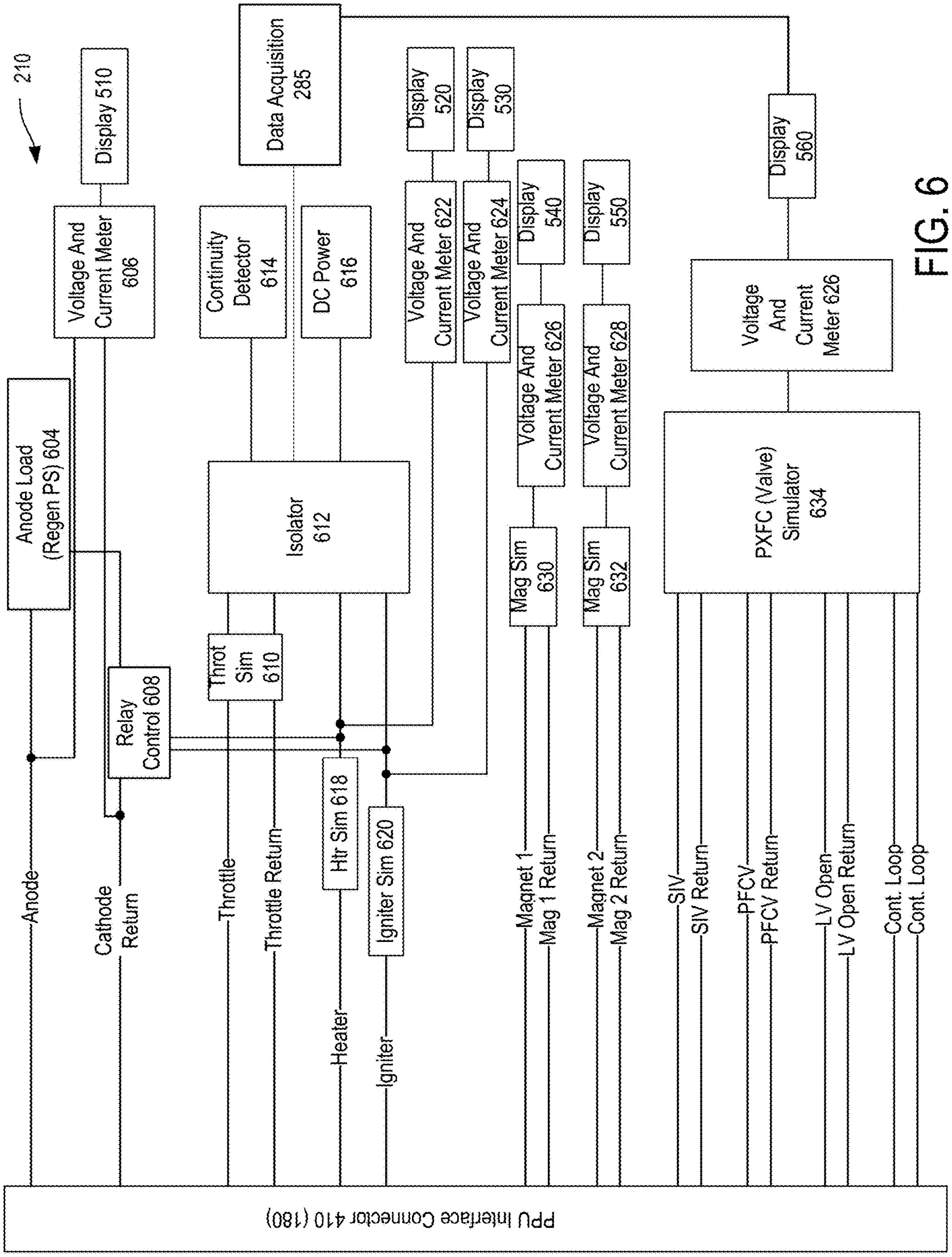
FIG. 6 is a block diagram illustrating the components of a PPU load simulator.

FIG. 6 illustrates the components of a load simulator 210. In general, a spacecraft's PPU is expected to provide control stimuli to the various components of the spacecraft as well as handle different loads provided by the spacecraft. A PPU under test, connected via connector 280 (and 410 of the simulator itself) receives an anode load 604 (provided by one of the regenerative power supplies) and a cathode return. In embodiments, resistive taps are used to measure the current and voltage on a number of the loads and signals from the PPU under test. The voltage between the anode (discharge) and cathode may be as high as 600 VDC. A voltage and current meter 606 measures the load supplied to the PPU and displays the voltage and current values to the display 510 illustrated in FIG. 5. With the spacecraft power systems described herein, there is significant high frequency noise on in the current pathway, with the noise being on the order of between 20-100 kHz. Arbitrary waveform generators in conjunction with the 12 kW regenerative supplies simulate this noise to the PPU under test. The load simulator 210 can also create error conditions. For example, relay control 608 may be used to simulate a "flameout" condition where an open circuit exists on the anode by opening a switch placed in line with the anode connection from the anode load 604.

The throttle and throttle return paths are coupled to a throttle simulator 610 which provides a representation of the throttle resistance of the spacecraft. The throttle simulator may comprise a series of resistors which replicate the load of the spacecraft throttle control. The throttle control from the throttle simulator is isolated using an isolator 612 from a continuity detector, a DC power supply 616 and the data acquisition and control unit 285. The continuity detector is used to verify the external cable is attached to the spacecraft under test. An unconnected or partially connected cable can present a dangerous electrical interface situation and damage to the spacecraft can occur. A heater simulator 618 and igniter simulator 620 are also coupled via the isolator 612 to the data acquisition unit 285, as well as respective voltage and current meters 622 and 624 which provide outputs to displays 520 and 530, respectively. Magnet simulators 630, 632 are coupled to voltage and current meters 626, 638, respectively which provide output to displays 540 and 500 of FIG. 5 for first and second magnets.

The PCFC (valve) simulator 634 simulates the resistances provided by the PPU to control latch valves, PFCV valves and SIV valves. Simulator 634 also includes a continuity loop detector. The output of the simulator 634 is provided to a voltage and current meter 626 and the valve states indicated on status panel 560. Each of the aforementioned voltages, currents and states simulated by the PPU simulator 210 are recorded by the data acquisition and control unit 285.

In addition to simulating the propulsion system of the spacecraft, the EPSC can simulate the positioning systems of the spacecraft. As previously described, multiple thrusters are generally provided on a spacecraft, mounted to two or three-axis positioning gimbals under the control of the command and data handling module 109. The ⅔ axis/latch valve simulator 215 tests the control outputs of the hardline module 109 with respect to flow valves in the PMA 152 and the thruster positioning system motors and provides feedback via an LED interface.

Figure 7:
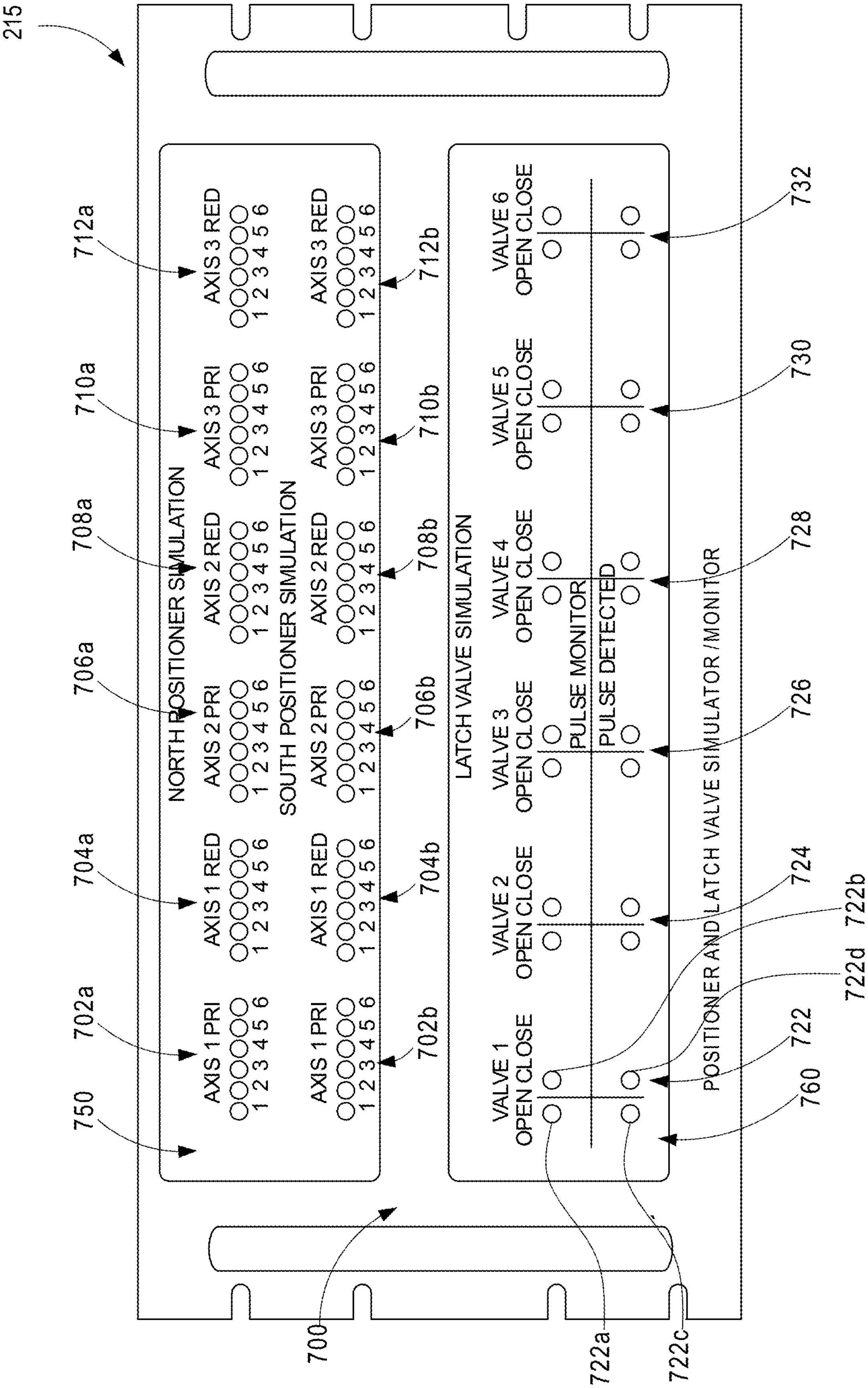
FIG. 7 is a front view of a ⅔ axis/latch valve simulator display panel.
Figure 8:
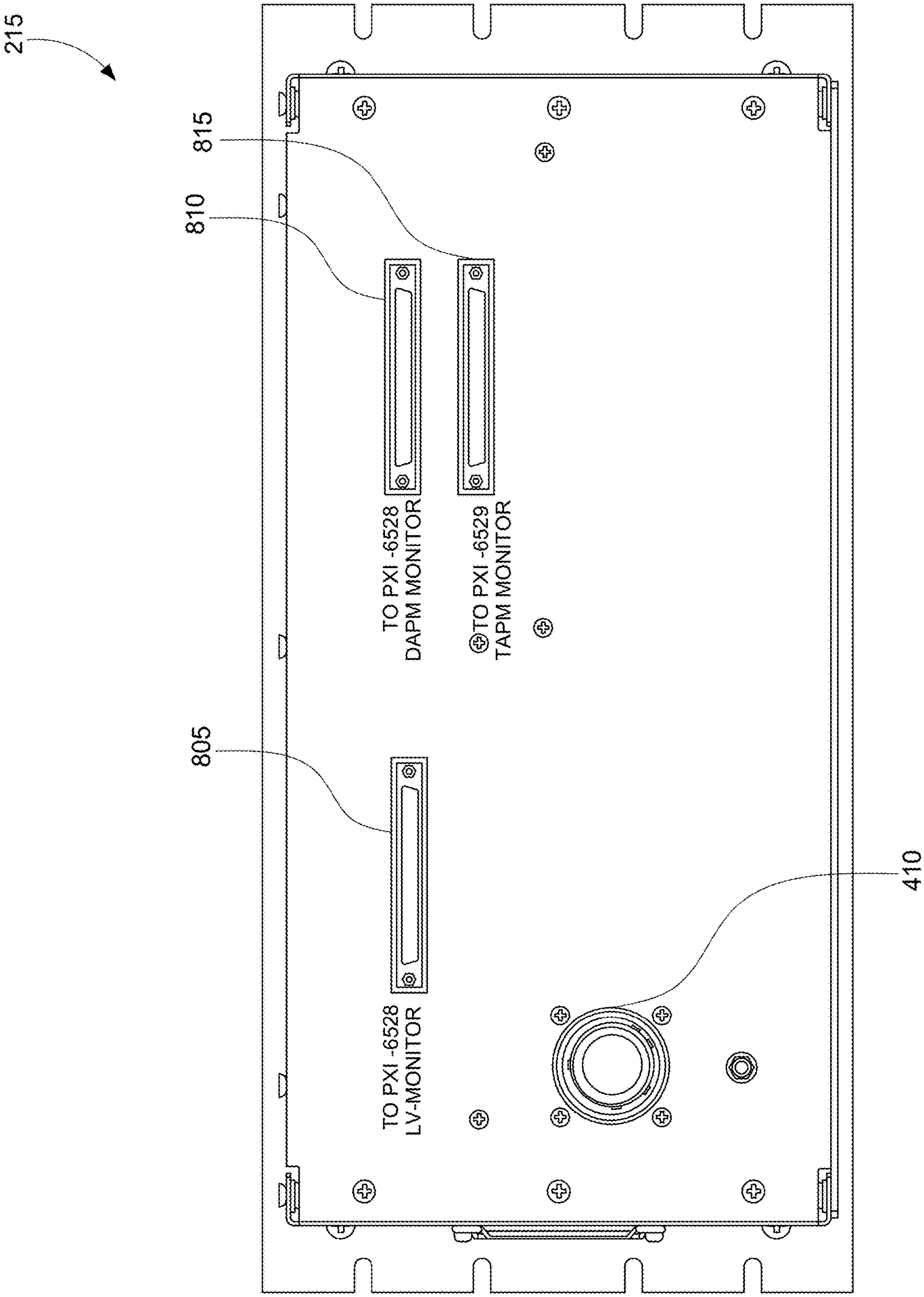
FIG. 8 is a rear view of the ⅔ axis/latch valve simulator illustrating connectors to the ⅔ axis/latch valve simulator.

FIGS. 7 and 8 illustrate the display interface and connection panels (front and back, respectively) of the ⅔ axis/latch valve simulator 215. As illustrated in FIG. 8, the control system connector 410 is provided on the rear of the unit, with additional communication connections to the controller for the latch valve monitor 805, DAPM monitor 810 and TAPM monitor 815 which are used depending on the configuration of the spacecraft under test. Each of the latch valve monitor 805, DAPM monitor 810 and TAPM monitor 815 may provide a connection to the data acquisition and control unit 285.

As illustrated in FIG. 7, the LED interface 700 a positioner state display 750 and a valve state display 760. The positioner state display 750 includes six-six-step axis positioning indicators 702*a*, 704*a*, 706*a*, 708*a*, 710*a*, 712*a* for a "north" positioner (motor) and six-six-step axis positioning indicators 702*b*, 704*b*, 706*b*, 708*b*, 710*b*, 712*b* for a "south" positioner (motor). Each indictor has six LEDs (1-6) identifying a step position of the positioner motor for a primary thruster (indicator 702*a*, 702*b* 706*a*, 706*b*, 710*a*, 710*b*) and a secondary thruster (indicators 704*a*, 704*b*, 708*a*, 708*b*, 712*a*, 712*b*) on each side of a spacecraft (designated "north" and "south", generally referring to the direction of the spacecraft about an orbital body). The sequence of display of the LEDs is designed to follow the stepped order of the positioner such that any out-of-order illumination of the LEDs indicates an error in the positioner.

The latch valve state display 760 provides four LEDs per valve, covering the six valves illustrated in FIG. 1B, at indicators 722, 724, 726, 728, 730, 732. To open or close a valve, a control pulse should be received from spacecraft control system. The output provides indicators for both the open (e.g. 722*a*) and close eg. (722*b*) pulse has been monitored and the open (e.g. 722*c*) or closed (e.g. 722*d*) state of each valve. Hence, two control pulse LEDs (one open, one close) and two state indicator LEDs (one open and one closed) are provided for each valve indicators 722, 724, 726, 728, 730, 732.

Figure 9:
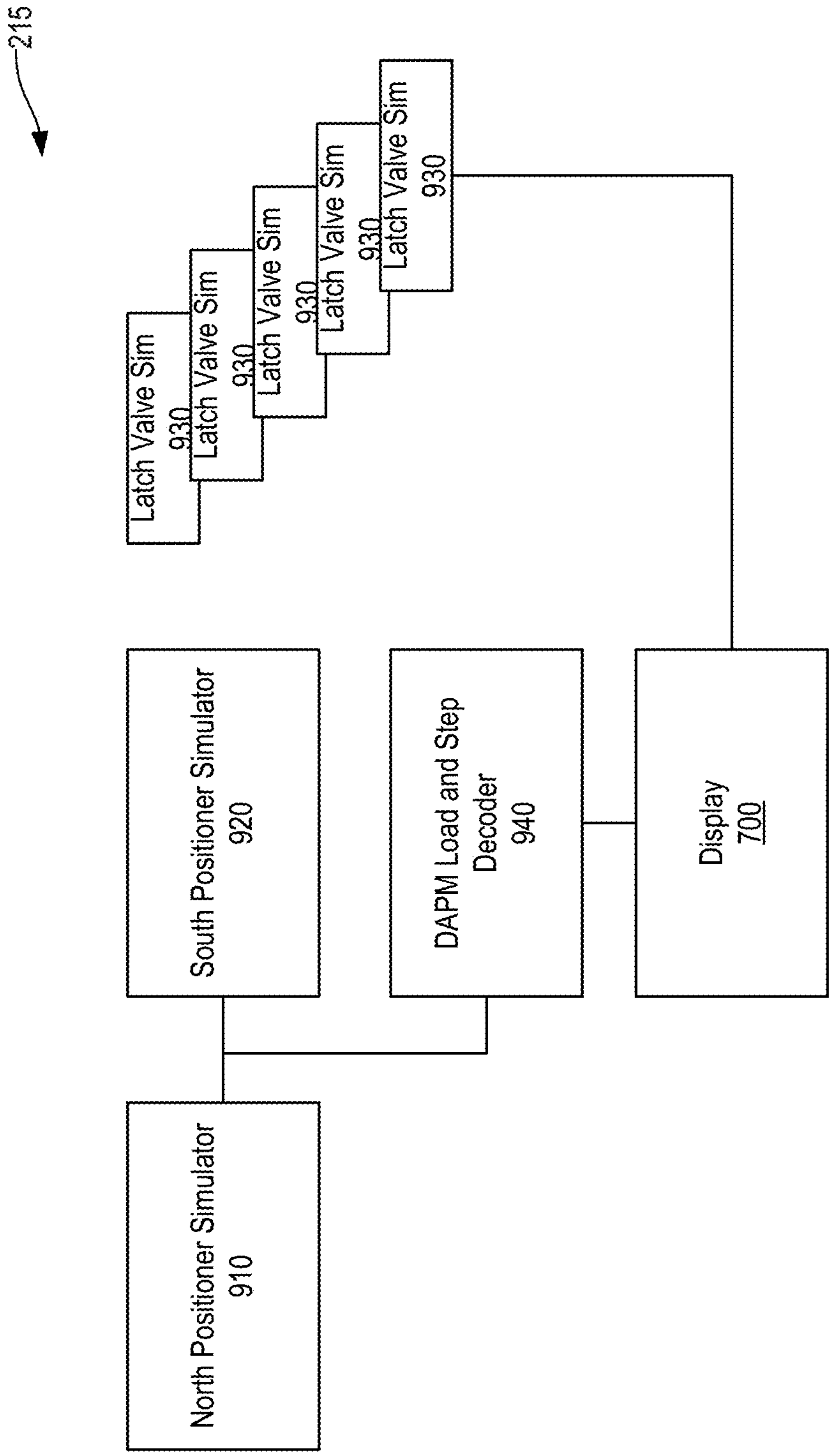
FIG. 9 is a block diagram illustrating the components of the ⅔ axis/latch valve simulator.
Figure 10A:
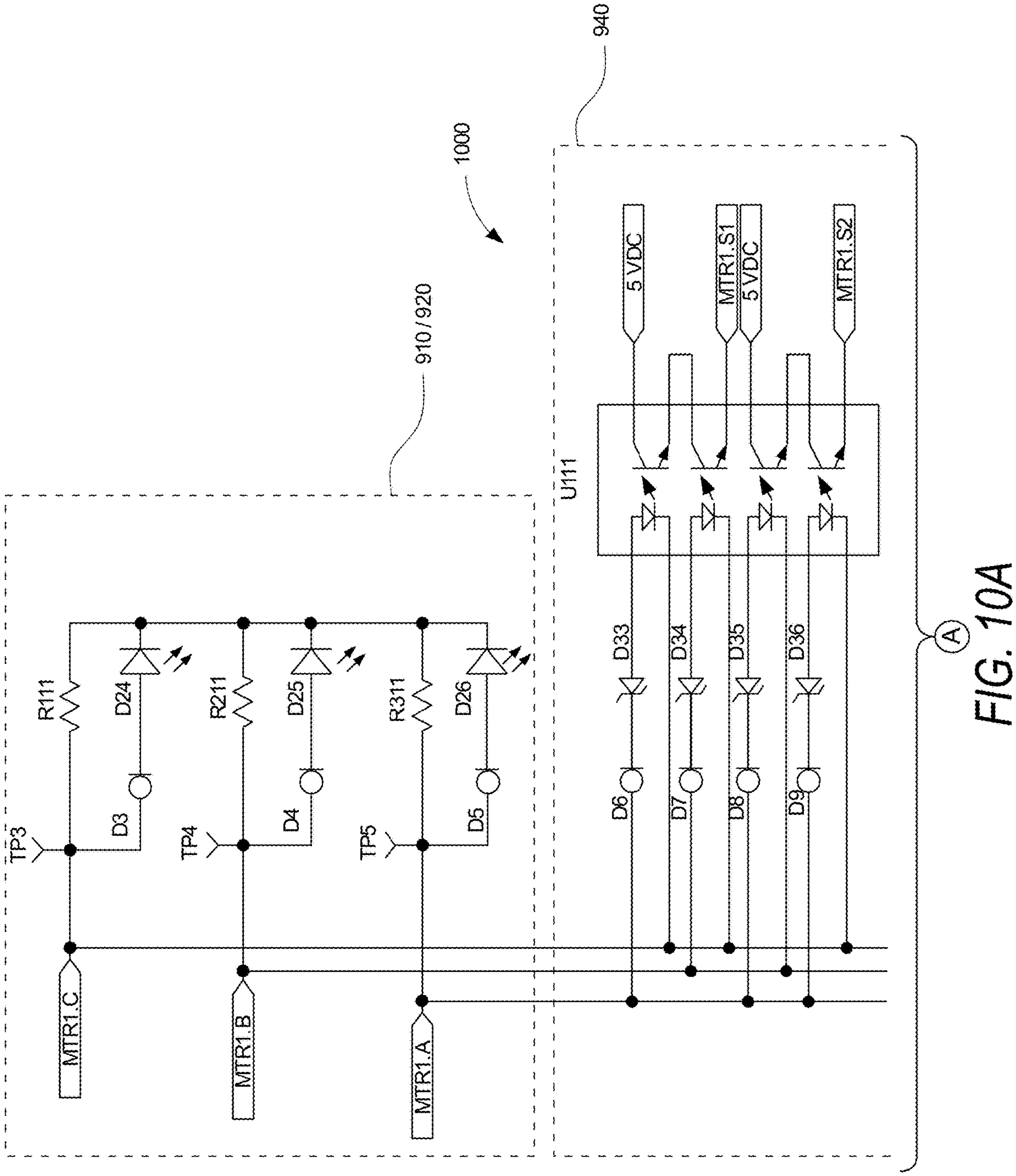
FIG. 10A is a schematic diagram of the motor load simulator and step decoder circuit illustrated in FIG. 9.
Figure 10A:
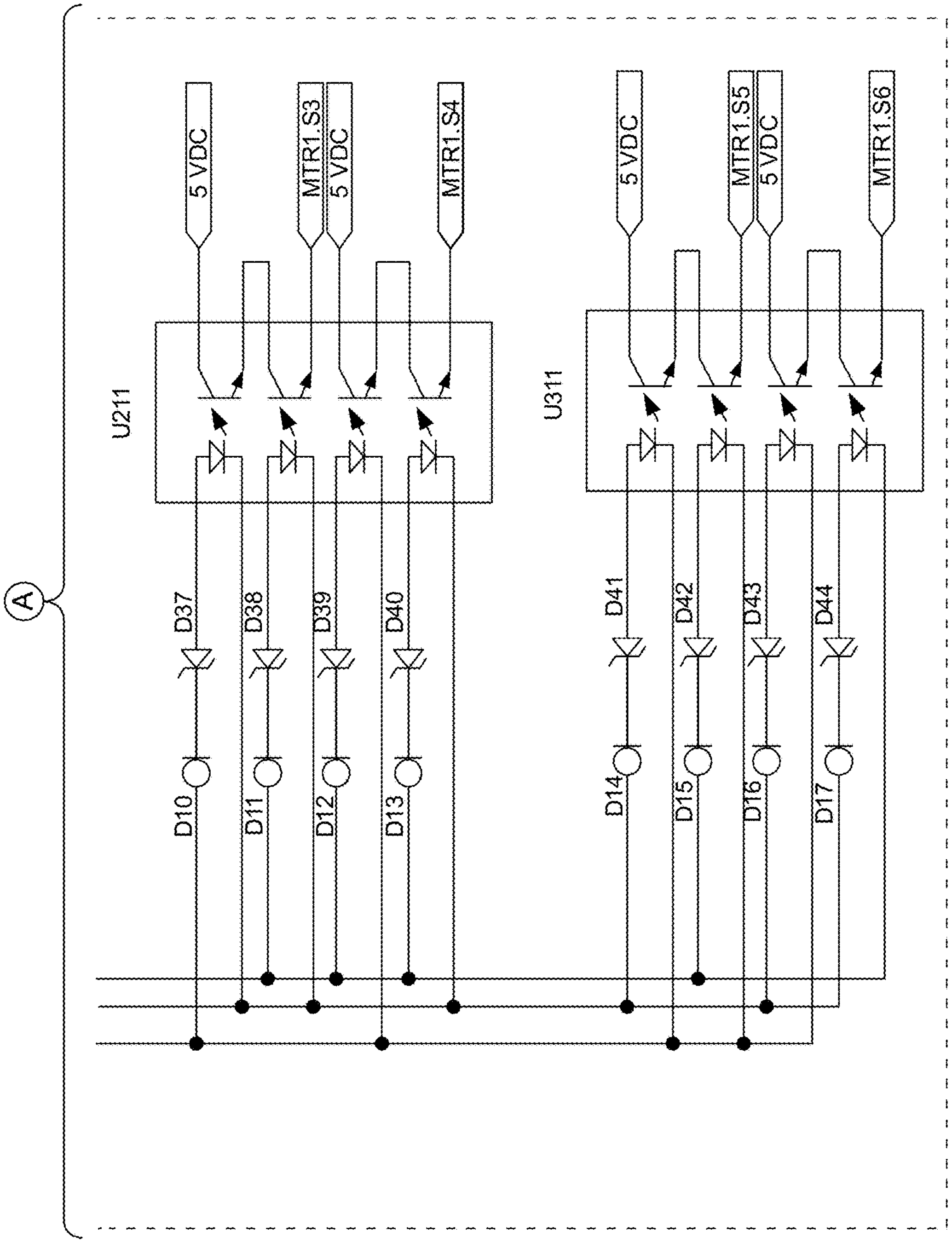

FIG. 9 is a block diagram of the components of the ⅔ axis/latch valve simulator 215. As shown therein, north positioner simulation circuitry 910 and south positioner simulation circuitry 920 simulate the loads expected by the spacecraft controller and provide the control voltages to a DAPM load and step decoder 940. Additional details on the load simulators 910/920 and step decoder 940 are shown in FIG. 10. Each of six latch valve simulators 930 is coupled to the LEDs of state display 760 with additional details of the latch valve simulators 930 shown with respect to FIG. 11.

FIG. 10 is a schematic diagram illustrating one of four simulator circuits (910/920) and one of four step decoder circuits used in the DAPM load and step decoder 940 of ⅔ axis/latch valve simulator 215. The circuit 1000 includes three voltage inputs (MTR1.A, MTR1.B, MTR1.C) for each of three phases of a three-phase motor (positioner) used to position a thruster. Each input is coupled to a load resistor R111, R211, R311, respectively, which are all tied together. Each load resistor is coupled in parallel with a current limiting diode (d3, D4, D5) and an LED D24, D25, D26 which indicates that activity is received on the input of the motor.

Figures 10B, 10C:
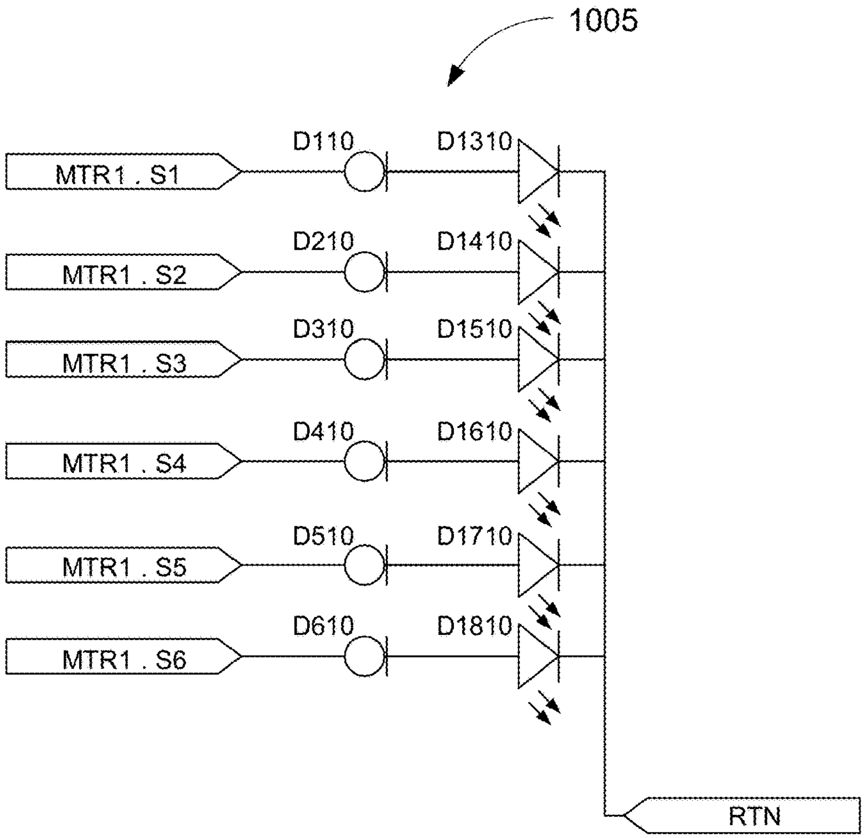
FIG. 10B is a state table for calculating the step state of a positioner.
FIG. 10C illustrates the output of the circuit of FIG. 10A to a set of display diodes.

Each of the three phase inputs are tied to the inputs of an optocoupler package U111, U211, U311 via a current limiting diode D6-D17 and a Zener diode D33-D44. The current limiting diodes and the Zener diodes ensure that the input voltage from the three-phase motor exceeds a minimum threshold thereby preventing spurious signals. The voltages input on each phase (MTR1.A, MTR1.B, MTR1.C) pass via a diode in the optocoupler to provide a logic high or low output on terminals MTR1.S1 through MTR1.S6. A logic table shown in FIG. 10B can then be used to decode the outputs MTR1.S1 through MTR1.S6 which are fed to display LEDs in output interface 750. Circuit 1005 shown in FIG. 10C illustrates the voltage outputs MTR1.S1 through MTR1.S6 coupled to respect LED displayed in the interfaces 702, 704, 706, 708, 710, 712 of FIG. 7.

As should be understood, for example, when the inputs of phase A and B are both high, and C low, the voltages at D6/D33 and D7/D34 are also high, activating a 5 VDC output on MTR1.S1, while all other outputs MTR1.S2 through MTR1.S6 are off though a combination of voltages on the diodes/transistors in the optocoupler package. As a result, only LED D27 will be illuminated in circuit 1005.

Figure 11:
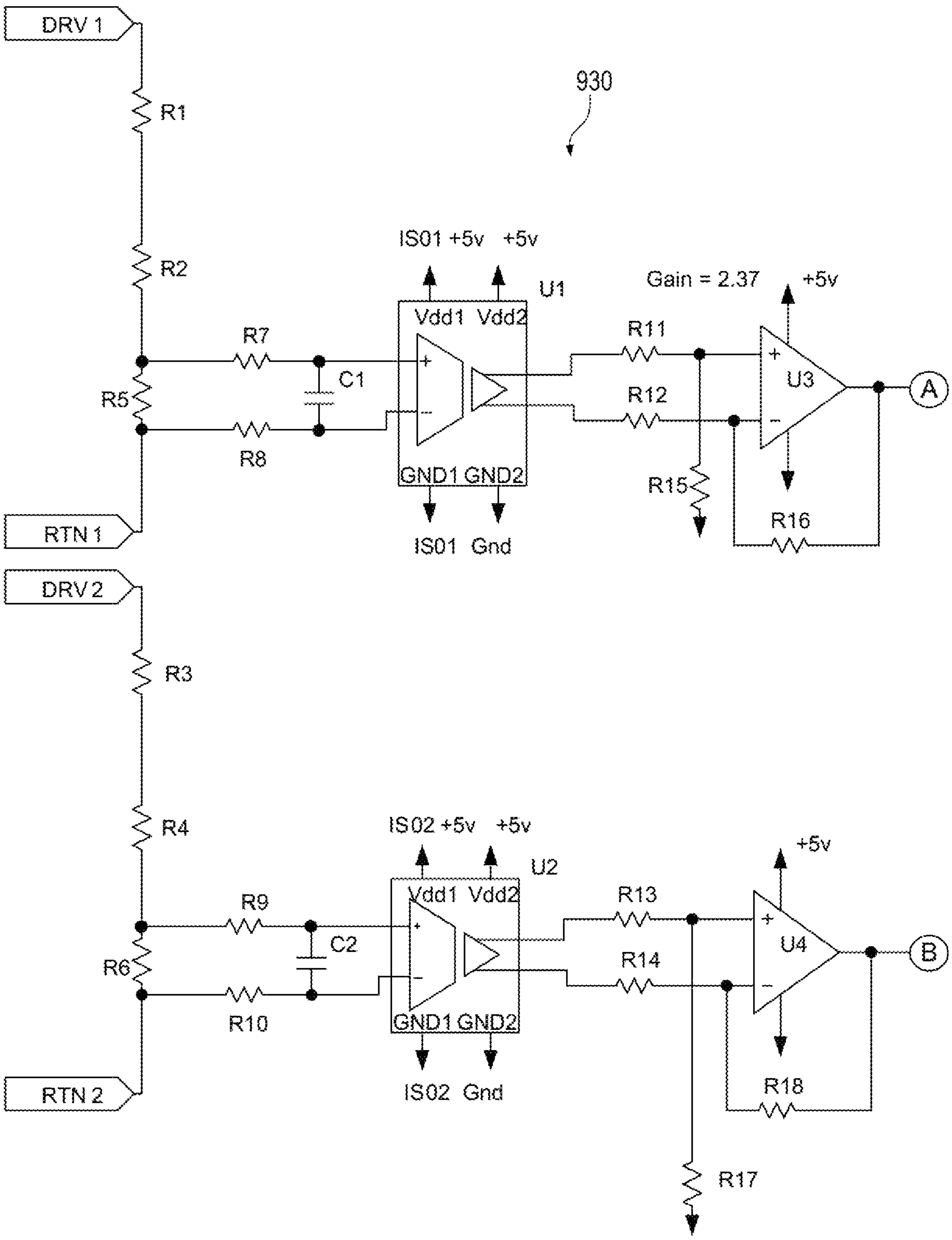
FIG. 11 is a schematic diagram of the latch valve pulse monitor circuit card circuitry illustrated in FIG. 9.
Figure 11:
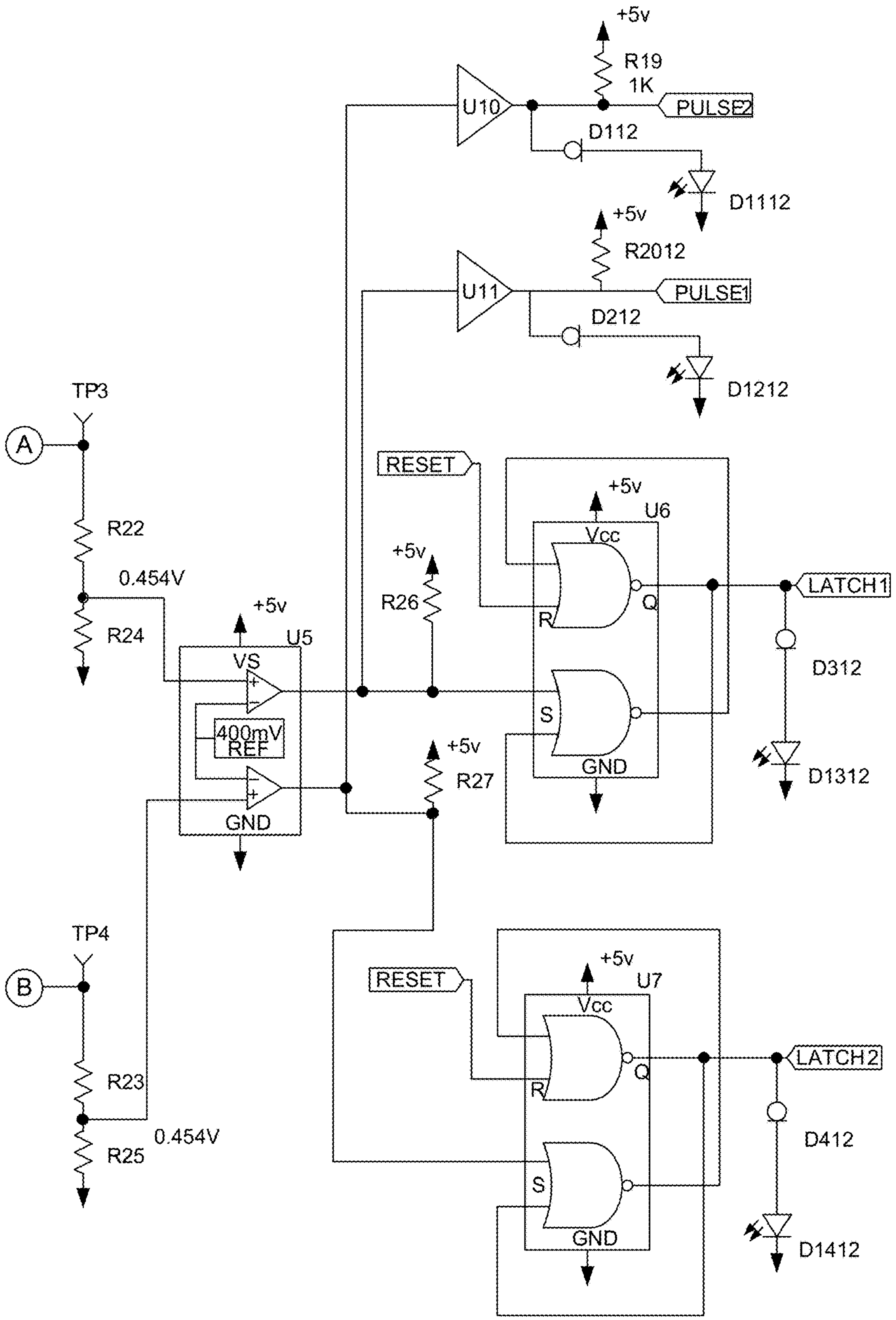

FIG. 11 is a schematic diagram of one of six latch valve simulators 930. The latch valves used in a spacecraft comprise bi-stable valves that energized to open (or close) the valve, and a maintains its open or closed without power applied. A latch valve coil is pulsed to change the valve state from closed to open and pulsed again to close it.

As such, FIG. 11 illustrates two drive paths beginning at DRV1/RTN1 and DRV2/RTN2 which drive the open and closed state of a latch valve. These drive paths are initiated by the data acquisition and control unit 285. Resistors R1-R4 (10 ohm each) simulate the windings of a latch valve (and in one embodiment may be combined into a single larger resistor). The input voltage for each driving pulse is provided to an isolation amplifier (U1, U2) with an output separated from the input circuitry by a silicon dioxide (SiO2) barrier that is highly resistant to magnetic interference to prevent noise currents on a high common mode voltage line from entering the local ground and interfering with or damaging sensitive circuitry.

The common mode voltage of the output signal is automatically adjusted to 5-V low-side supply with a fixed gain of 8 times the input voltage. The outputs of the isolation amplifiers U1 and U2 are provided to respective voltage amplifiers U3 and U3, each of which provides a gain of approximately 2.37 The output of the voltage amplifiers is provided to scaling resistors R22/R24 and R23/R35 and input to a comparator U5. At the input of the comparator, the voltages from the scaling resistor is approximately 0.4-0.5 volts (and in one embodiment 0.45V). The comparator U5 may implemented by an integrated circuit combining two micropower, low voltage comparators with a 400 mV reference for low voltage system monitoring. The comparators each have one input available externally; the other inputs are connected internally to the reference. Hence, the comparator is to ensures that its input signal is greater than the 400 mV reference.

The comparator U5 output is initial provided to amplifiers U10 and U11, which provide pulse signals PULSE1 and PULSE2 to the controller and indicate pulses on LEDs D1112 and D1212 on the pulse monitor portion of interface 720. The comparator output is also provided to two-two input, two channel NOR gates U6, U7, which latch the output, provide the latch state signals LATCH1 and LATCH2 for recording by the controller and drive LEDs D1312 and D1412 which display on the state display 750.

As noted herein, the EPSC includes a built-in test unit 240. FIGS. 12 and 13 illustrate the front and rear connection components of the built-in test unit 240. Built in test unit 240 may be connected to any of the connectors 280 via connector 1210 to provide simulation of the control signals of a spacecraft PPU and may be connected to ⅔ Axis/Latch Valve simulator connector 410 via connector 1220. The rear panel in FIG. 13 includes a connector 1230 for DC power input, and three connectors 1240, 1250, 1260 for respective data acquisition and control from the data acquisition and controller unit 285.

Figure 14:
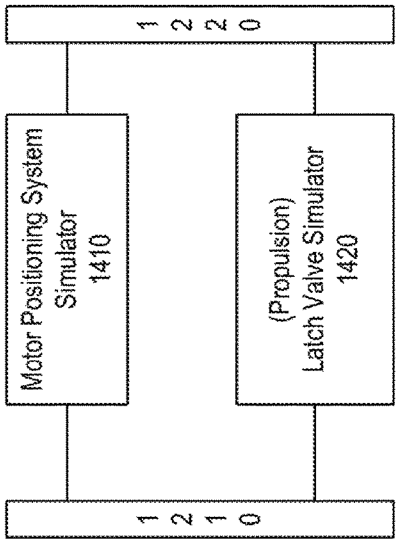
FIG. 14 is a block diagram of the motor positioning and latch valve simulator.

FIG. 14 illustrates the general components of the built-in self-test unit 240. Unit 240 includes a motor positioning system simulator 1410 comprising circuitry which simulates the control signals coming from the spacecraft controller relative to positioning thruster motors. This is generally described in further detail with respect to FIG. 15. These signals are those which the EPSC tests as described with respect to FIG. 10. A latch valve simulator 1420 includes circuitry, further described with respect to FIG. 16, which simulates the control signals for opening and closing the latch valves used in the propulsion system.

Figure 15:
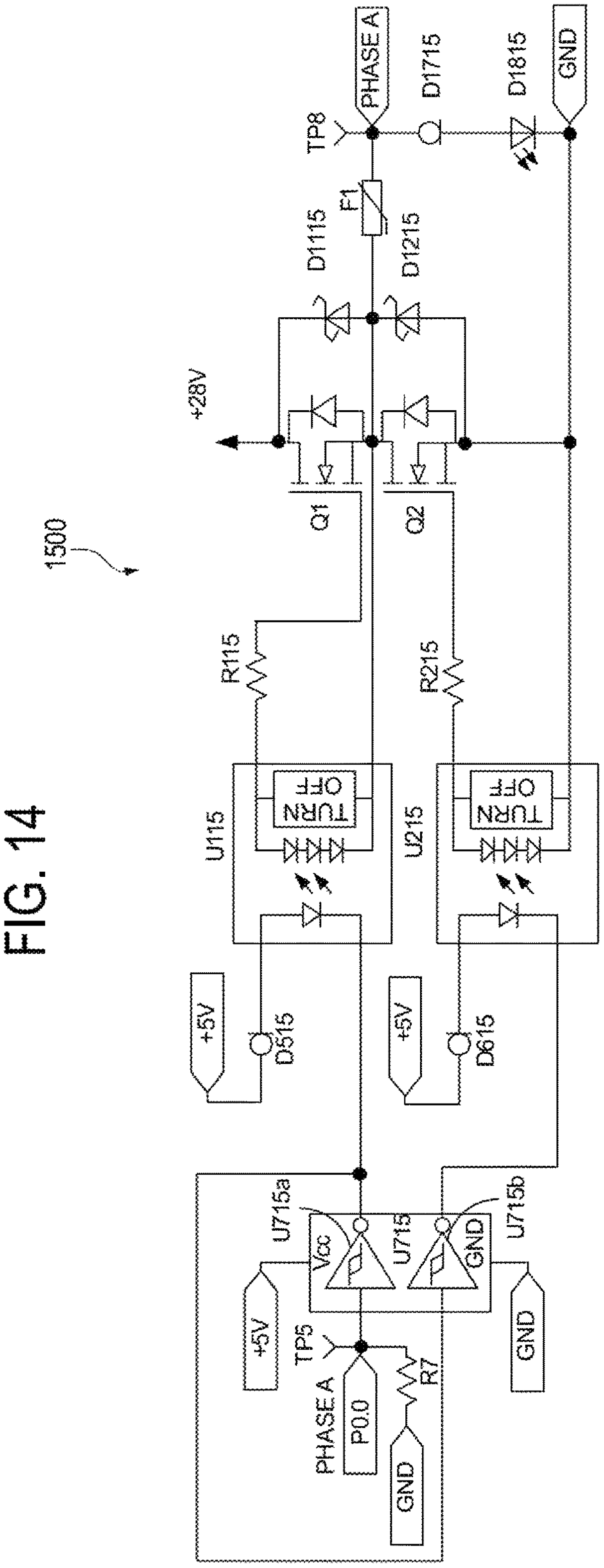
FIG. 15 is a schematic diagram of one of six circuits for the motor pulse simulation circuit.

FIG. 15 illustrates a motor positioning simulator circuit 1500. Three such circuits are proved for each motor simulation, one for each phase. While "phase A" simulator is shown, two identical circuits are provided for phases "B"

and "C" of each motor. An input "PHASE A" control is provided to a two input Schmitt inverter package U715. An input of first inverter U715*a* is coupled to the PHASE_A input {0.0 and the output of inverter 715*a* is coupled to the input of a second inverter U715*b*. The output of the first inverter is also provided to a photovoltaic MOSFET driver with an integrated solid-state relay U115. Devices U115 and U215 are stand-alone optically isolated MOSFET drivers which obtain drive current for internal circuitry from LED current on the low voltage primary side of the isolation barrier. Each of U115 and U215 drive one of MOSFETS Q1 and Q2, respectively, to couple the PHASE_A output between a 28V rail and ground according to the PHASE_A input (P0.0), thereby simulating the voltage input from a spacecraft controller. The signal applied to P0.0 is a logic level signal that comes from a digital interface card which is part of the controller 285.

Figure 16:
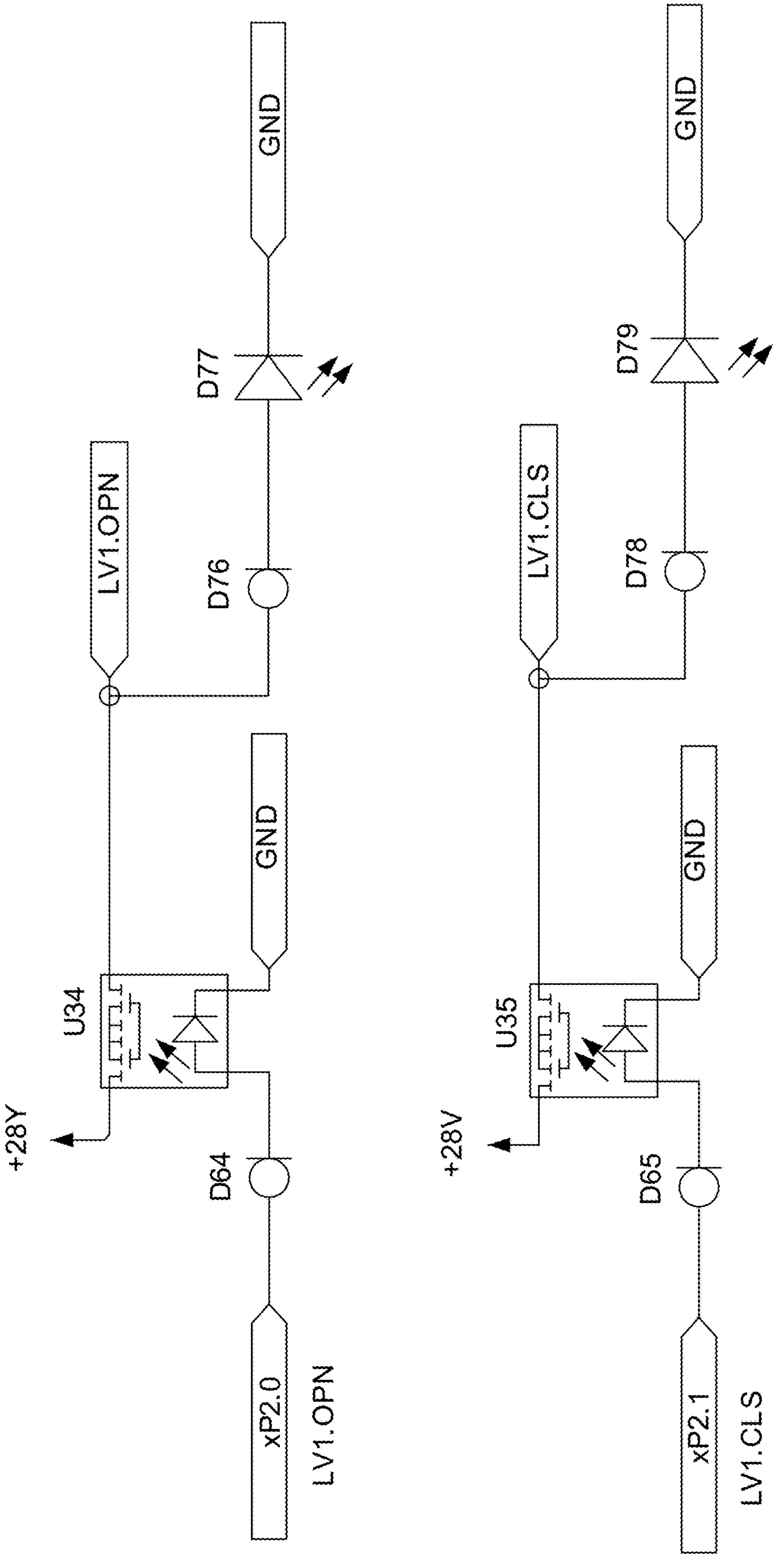
FIG. 16 is a schematic diagram of a pair of six latch valve pulse simulator circuits.

FIG. 16 illustrates a pair of latch valve simulator circuits. Six such pairs of latch valve simulator circuits are provided in the latch valve simulator 1420. A latch valve open LV1.OPN or closed LV1.CLS signal is input via a current limiting diode (D64, D65) to a photovoltaic relay U34/U35. A high input on either passes the 28V rail to the open and close outputs LV1.OPN and LV2.CLS, respectively. The output also provides a visual indicator of the LV1.OPN and LV1.CLS signals via LEDs D77 and D79. The signal P0.0 is a logic level signal that comes from a digital interface card which is part of the controller 285

Figure 17:
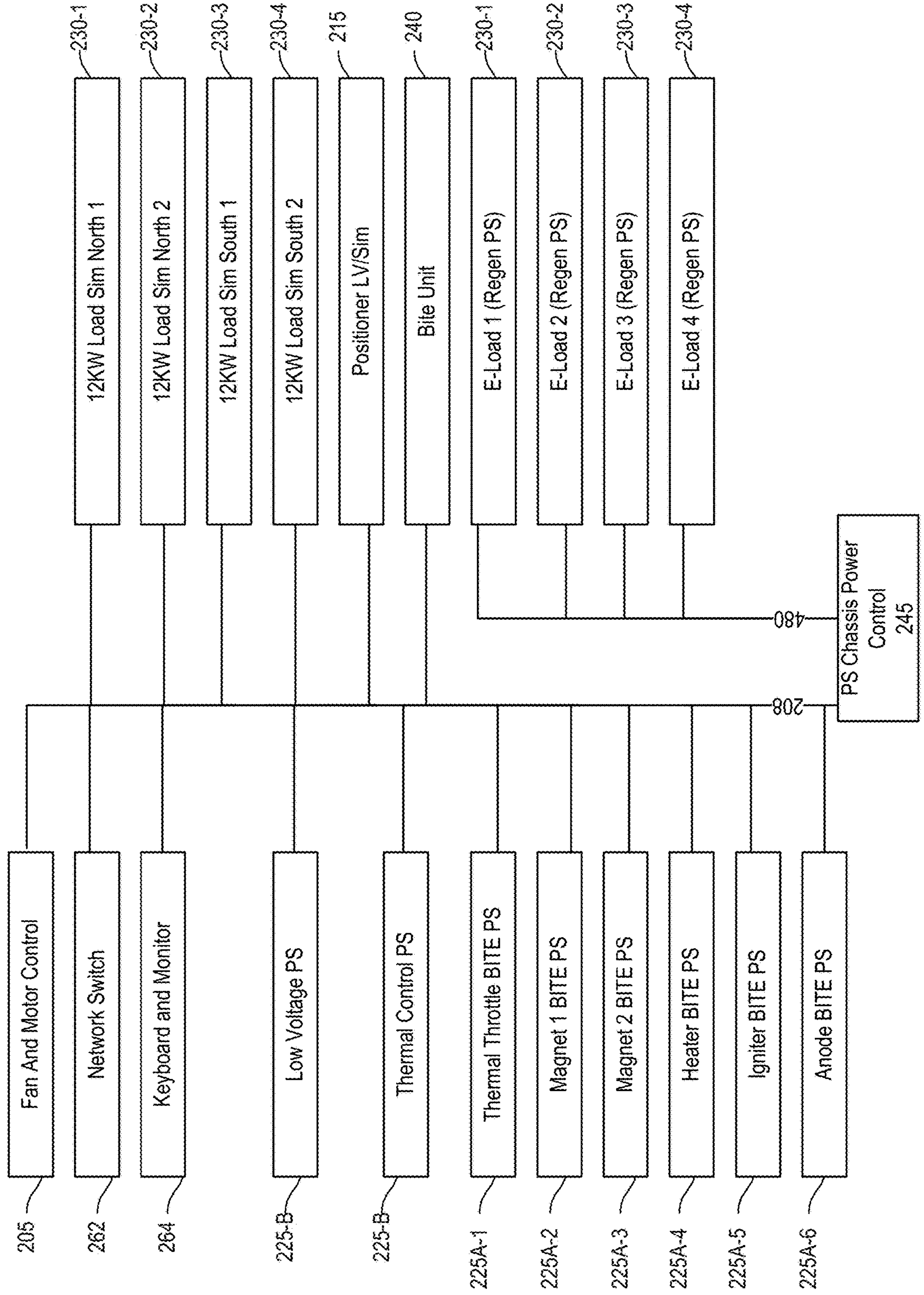
FIG. 17 is a block diagram of power distribution in the electric propulsion simulator console.

FIG. 17 is a block diagram of power distribution components in the EPSC 200. AC power control and distribution supply 245 comprises a dual 208V/480V three phase power supply. The four regenerative power supplies 230-1 to 230-4 are supplied by the AC power supply control and distribution unit 245 via the 480V side, while the other components illustrated in FIG. 17 are supplied by the 208V supply. Illustrated therein are the power supplies 225-1-225-7 for the BITE power supplies, and for the load simulators 230-1-230-4.

Figure 18A:
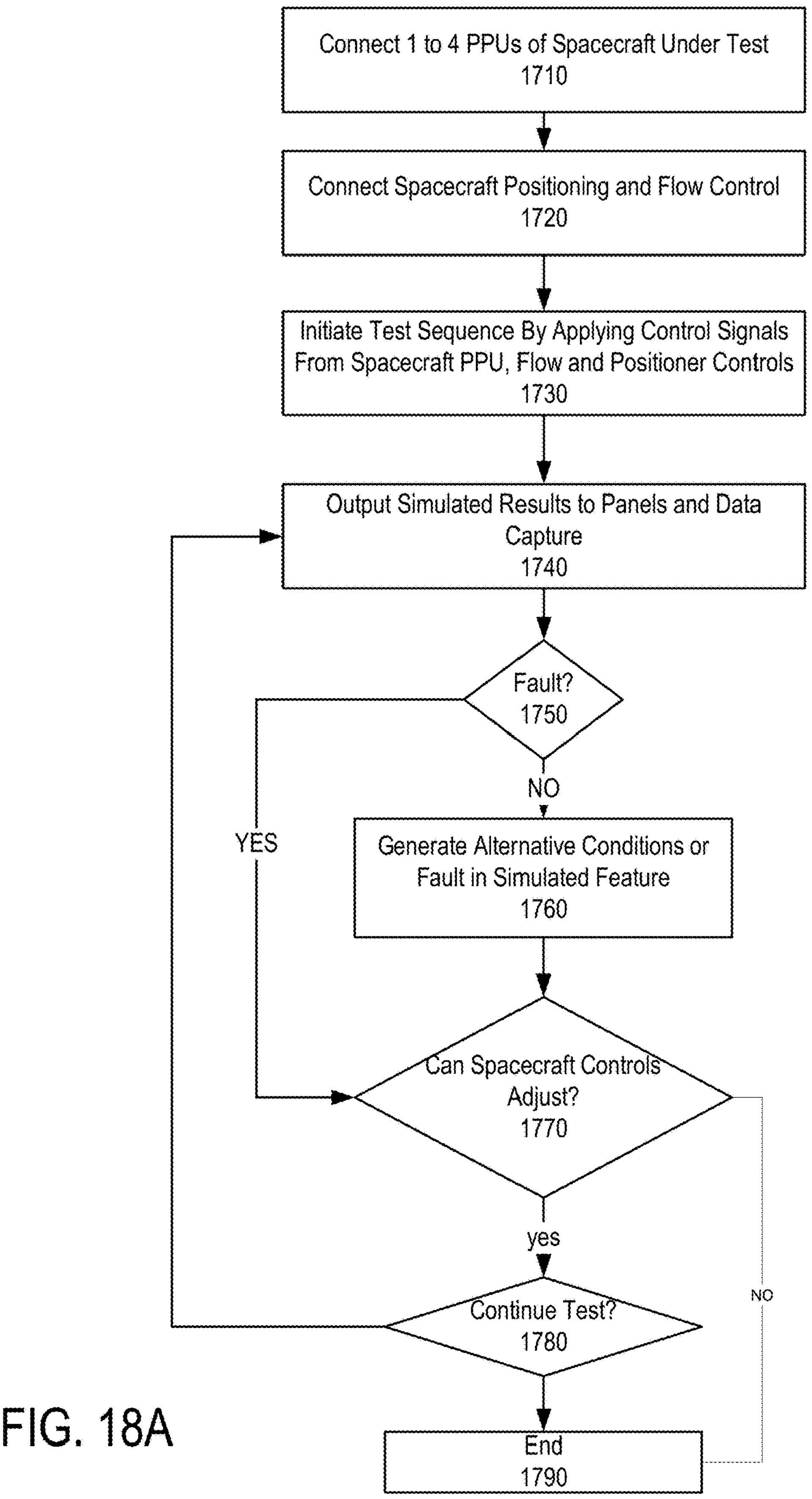
FIG. 18A is a flowchart illustrating one method of utilizing the simulator console.

FIG. 18A illustrates a method of performing a test on a spacecraft in accordance with one embodiment of the technology. At 1710, up to four PPUs of a spacecraft may be coupled to the EPSC 200. At 1720, spacecraft command and data handling module 109 may be coupled to the EPSC. It should be understood that in alternative methods, one of steps 1710 and 1720 may be omitted. As such, either PPUs alone may be tested, or positioning and flow control may be tested. At 1730, a test sequence may be initiated by applying control signals from the spacecraft PPU and/or positioner controls. The EPSC will monitor the stimuli provided by the respective spacecraft elements and output results to the display panels, as well as capture various data as described herein at 1740.

If a fault is detected at 1750, a determination is made by a testing agent as to whether the spacecraft can adjust to the fault at 1770 or whether the fault necessitates repair of the spacecraft. If no fault is detected, the optionally a fault or other, nonstandard operating conditions or a different test environment (LEO, GEO or Deep Space conditions) may be created at 1760 and a determination again made as to whether the spacecraft can adjust to the change at 1770. If the spacecraft cannot adjust, the test may end. The test continues at 1780 for as long as the test agent under control of the EPSC and the spacecraft determine to continue the test.

Figure 18B:
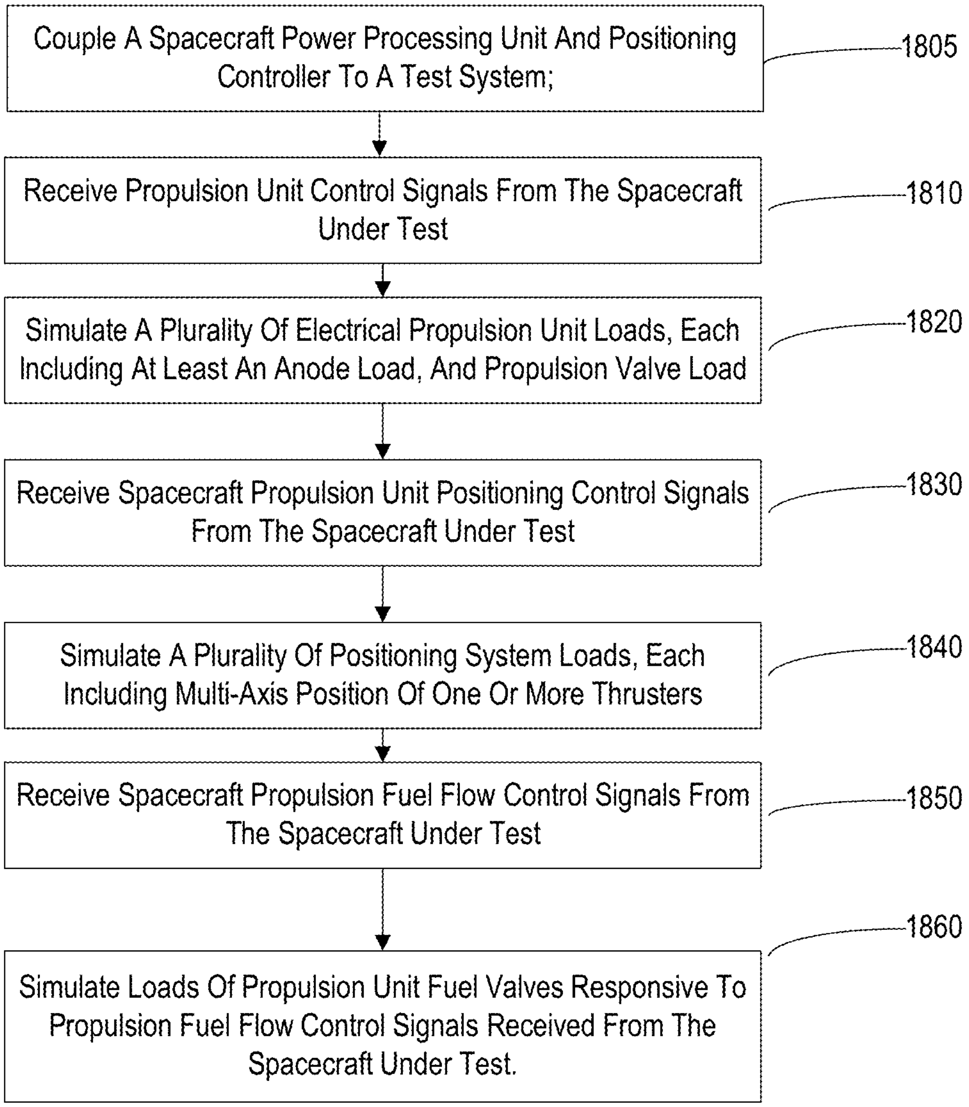
FIG. 18B is a flowchart illustrating a method of testing a spacecraft in accordance with this disclosure.

FIG. 18B illustrates a general method in accordance with the disclosure. In one embodiment of method of testing a control system of a spacecraft under test, initially, the method includes coupling a spacecraft power processing unit and positioning controller to a test system such as the EPSC. At 1810, the test system receives propulsion unit control signals from the spacecraft under test. At 1820, the test system simulates a plurality of electrical propulsion unit loads, each including at least an anode load, magnet, heater and propulsion valve load. In one embodiment, this is performed by the load subsystems (e.g. 211). At 1830, the test system receives receiving spacecraft propulsion unit positioning control signals from the spacecraft under test and at 1840, simulates a plurality of positioning system loads, each including multi-axis position of one or more thrusters. At 1850, the test system receives spacecraft propulsion fuel flow control signals from the spacecraft under test; and at 1860 the system simulates loads of propulsion unit fuel valves responsive to propulsion fuel flow control signals received from the spacecraft under test. Additionally, the test system can display displaying a voltage and current output for the electrical propulsion unit loads, a motor position state reflecting the multi-axis position of the one or more thrusters, and a state for each of the propulsion unit fuel valves.

Figure 19:
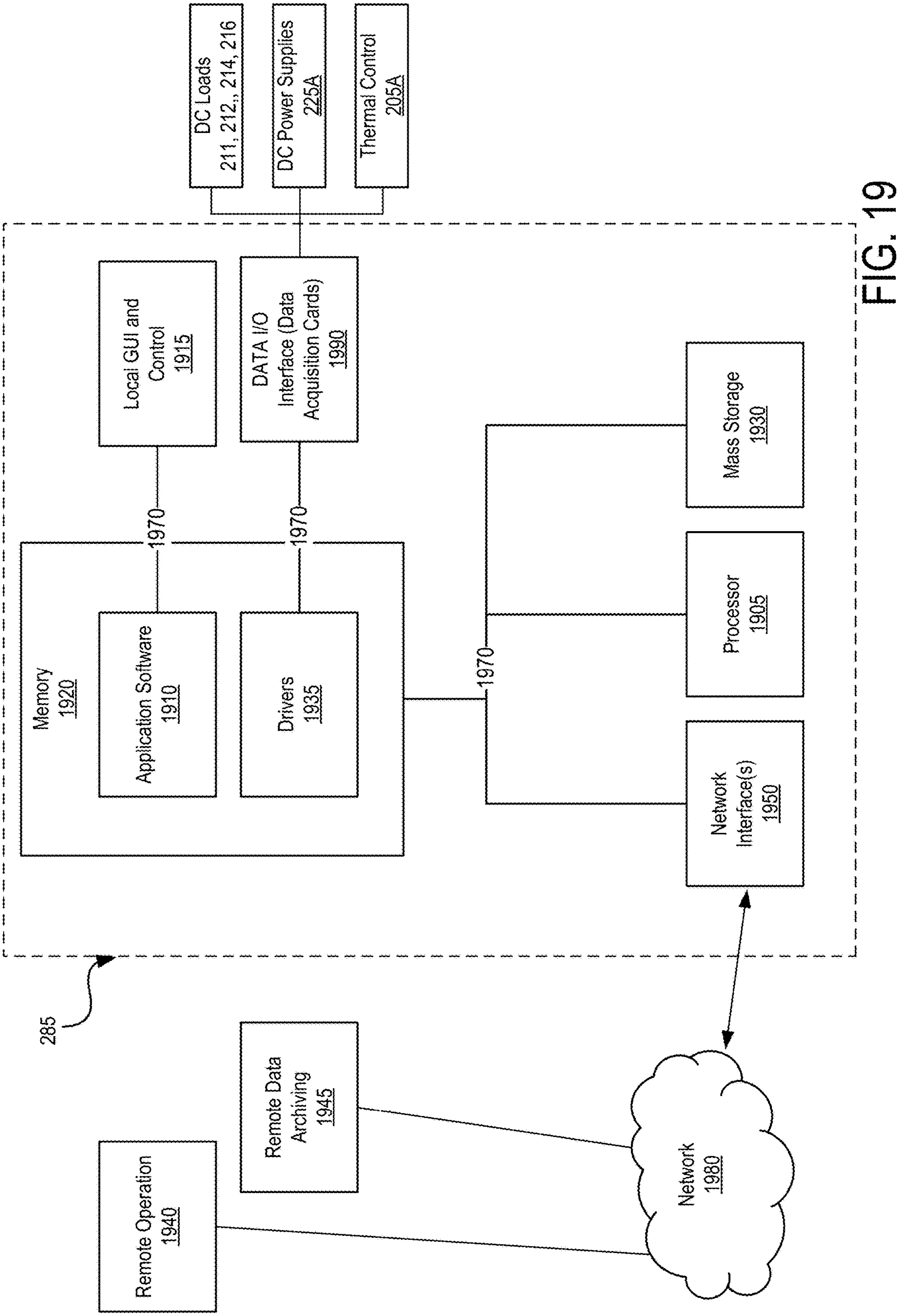
FIG. 19 is a block diagram of the data acquisition and controller unit 285.

FIG. 19 is a block diagram of a data acquisition and controller unit 285 that can be used to implement various embodiments. The data acquisition and controller unit 285 includes a processor 1905 (such as the a PXIe-8840 a dual or quad core micro-processor PXI Controller PXIe-8840) equipped with one or more input/output devices, such as network interfaces, storage interfaces, and the like. The data acquisition and controller unit 285 may further include a memory 1920, a mass storage device 1930, and an I/O interface 1990 connected to a bus 1970. The bus 1970 may be one or more of any type of several bus architectures including a memory bus or memory controller, a peripheral bus, or the like. A network interface 1950 enables the network processing device to communicate over a network 1980 with other processing devices which provide remote control operations 1940 and remote data archiving 1945.

In one embodiment, the memory 1920 includes computer readable instructions that are executed by the processor(s) 1905 to implement embodiments of the disclosed technology, including the testing application software 1910 and drivers 1935. The application software 1910 may generate a local graphical user interface (GUI) and control functions to allow a test operator to interface with any of the components discussed herein. Drivers 1935 allow a data I/O interface 1990 (which may comprise various data acquisition cards in the aforementioned PXI system embodiment) which may be connected through various connectors and cabling to the DC load subsystems 211, 212, 214, 216, DC power supply subsystem 225A and thermal control subsystem 205A.

Figure 20:
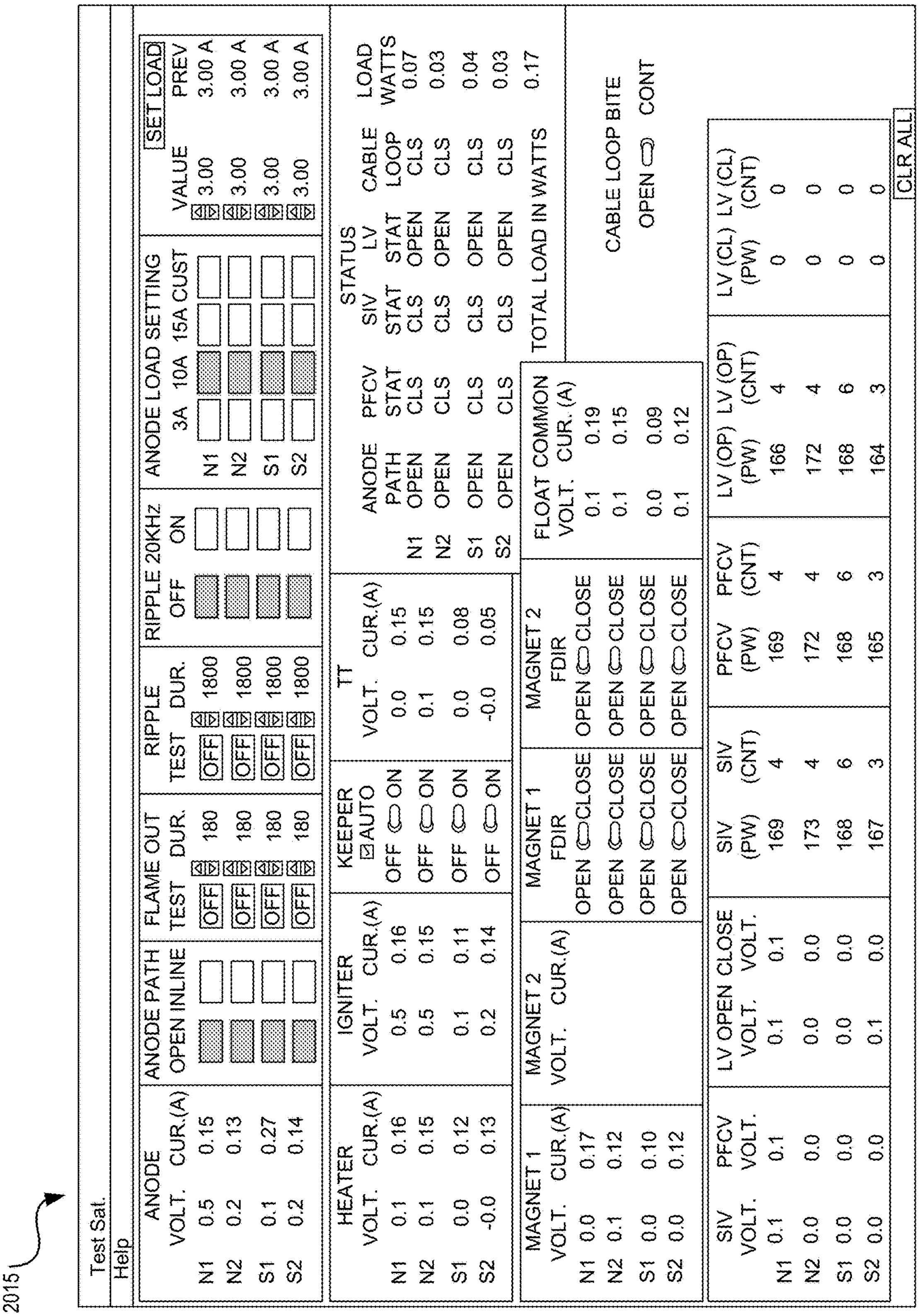
FIG. 20 is one example of an interface GUI for the electric propulsion simulator console.

The mass storage device 1930 may comprise any type of storage device configured to store data, programs, and other information and to make the data, programs, and other information accessible via the bus 1970. The mass storage device 1930 may comprise, for example, one or more of a solid-state drive, hard disk drive, a magnetic disk drive, an optical disk drive, or the like. The application software may be run under an operating system such as Windows from Microsoft corporation, with application code developed in LabWindows™/CVI from National Instruments corporation. The application software includes routines to monitor Anode, Heater, Igniter, Magnet, Thermothrottle voltages and currents for the North 1, North 2, South 1, and South 2 thrusters, and simulators to support the Ripple and Flame Out functions for such thrusters. The application software includes DAPM/TAPM Simulators to monitor step sequence and direction, and Support 2 and 3 axis deployment mechanisms, one for South and one for North each with Primary and Redundant motors. The remote control allows scripting of different testing applications. Data Archiving allows measured components to be downloaded and analyzed by sending monitored parameters) for archiving. Different processor threads may be created by the SPT software application to interface with the respective PXI cards for control and monitor upon system start up. Such threads can run continuously until the application is shut down FIG. 20 illustrates one example of a GUI screen displayed to a test user operating the EPSC. As illustrated therein, monitored parameters (such as the voltage and current of the anode, heater igniter, thermothrottle (tt), and magnets) may be displayed in the GUI at a refresh rate specified by the test user (e.g once per second). The status of various valves (anode, PFCV, SIV, LV) are also displayed, as are controls for the magnets (illustrated as conventional throw switches). Operator action messages and relevant system information are logged and displayed in a system log page (not illustrated).

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A spacecraft test apparatus, comprising:

an electrical propulsion unit load simulator including power electronics comprising at least one regenerative power supply, resistive and/or electronic load circuitry electrically coupled to the at least one regenerative power supply, current and voltage sensing circuitry, and a power processing unit (PPU) connector, the resistive and/or electronic load circuitry being configured to electrically simulate an anode load and propulsion valve electrical loads for an electric propulsion unit, and to receive propulsion unit control signals from a spacecraft under test via the PPU connector;

a spacecraft propulsion unit positioner simulator including positioner load circuitry, step decoding circuitry, indicator circuitry, and a spacecraft control unit connector, the spacecraft propulsion unit positioner simulator being configured to receive multi-phase propulsion unit positioning control signals from the spacecraft under test, decode the positioning control signals, and display a simulated state of three-axis movement for the propulsion unit positioner simulator; and a propulsion unit fuel valve simulator including latch valve state circuitry, valve control circuitry and indicator circuitry, the propulsion unit fuel valve simulator being configured to receive propulsion unit fuel valve control signals from the spacecraft under test and display a simulated open or closed state of propulsion unit fuel valves.

2. The spacecraft test apparatus of claim 1 wherein the electrical propulsion unit load simulator includes a throttle simulator comprising a series of resistors configured to replicate the load of a spacecraft throttle control.

3. The spacecraft test apparatus of claim 2 wherein the electrical propulsion unit load simulator includes a display providing a voltage and current output for an anode simulator, heater load simulator, igniter simulator and the at least one magnet load simulator.

4. The spacecraft test apparatus of claim 2 wherein the electrical propulsion unit load simulator includes a state display providing the state of propulsion unit latch valves simulated.

5. The spacecraft test apparatus of claim 1 further including a test apparatus controller coupled via a communication bus to the electrical propulsion unit load simulator, spacecraft propulsion unit positioner simulator and propulsion unity fuel valve simulator.

6. The spacecraft test apparatus of claim 1 wherein the spacecraft propulsion unit positioner simulator includes simulator circuits and decoder circuits adapted to simulate the state of at least two three-axis, three phase propulsion unit positioner motors.

7. The spacecraft test apparatus of claim 1 further including a motor positioning circuitry adapted to simulate controls signals from a spacecraft controller.

8. The spacecraft test apparatus of claim 1 wherein the electrical propulsion unit load simulator, a spacecraft propulsion unit positioner simulator and propulsion unit fuel valve simulator are provided in a rolling chassis.

9. A spacecraft testing system, comprising:

a plurality of electrical propulsion unit load simulators, each including power electronics comprising at least one regenerative power supply, resistive and/or electronic load circuitry electrically coupled to the at least one regenerative power supply, current and voltage sensing circuitry, and a power processing unit (PPU) connector, the resistive and/or electronic load circuitry being configured to electrically simulate an anode load and propulsion valve electrical loads for an electric propulsion unit, and to receive propulsion unit control signals from a spacecraft under test via the PPU connector;

a spacecraft propulsion unit positioner simulator including positioner load circuitry, step decoding circuitry, indicator circuitry, and a spacecraft control unit connector, the spacecraft propulsion unit positioner simulator being configured to receive multi-phase propulsion unit positioning control signals from the spacecraft under test, decode the received signals, and display a simulated state of three-axis movement for at least one propulsion unit simulator; and a propulsion unit fuel valve simulator including latch valve state circuitry, valve control circuitry and indicator circuitry, the propulsion unit fuel valve simulator being configured to receive propulsion unit fuel valve control signals from the spacecraft under test and display a simulated open or closed state of propulsion unit fuel valves.

10. The spacecraft testing system of claim 9 wherein each of the plurality of electrical propulsion unity load simulators is associated with the at least one regenerative power supply providing 20 KW at 480 VAC.

11. The spacecraft testing system of claim 9 further including a display providing a voltage and current output for an anode simulator, heater load simulator, igniter load simulator and first and second magnet load simulators.

12. The spacecraft testing system of claim 9 further including a test system controller coupled via a communication bus to the plurality of electrical propulsion unit load simulators, spacecraft propulsion unit positioner simulator and propulsion unit fuel valve simulator.

13. The spacecraft testing system of claim 12 wherein the test system controller is adapted to control the load simulated by any of the plurality of electrical propulsion unit load simulators, spacecraft propulsion unit positioner simulator and propulsion unit fuel valve simulator to vary load conditions.

14. The spacecraft testing system of claim 9 wherein the spacecraft propulsion unit positioner simulator includes simulator circuits and decoder circuits adapted to simulate the state of at least two three-axis, three phase propulsion unit positioner motors.

15. The spacecraft testing system of claim 9 further including motor positioning circuitry adapted to simulate control signals from a spacecraft controller.

16. The spacecraft testing system of claim 9 wherein the plurality of electrical propulsion unit load simulators, spacecraft propulsion unit positioner simulator and propulsion unit fuel valve simulator are provided in a rolling chassis.

* * * * *